United States Patent
Zhang et al.

(10) Patent No.: US 11,949,908 B2
(45) Date of Patent: *Apr. 2, 2024

(54) ADAPTIVE AFFINE MOTION COMPENSATION UNIT DETERMINING IN VIDEO PICTURE CODING METHOD, VIDEO PICTURE DECODING METHOD, CODING DEVICE, AND DECODING DEVICE

(71) Applicant: Huawei Technologies Co., Ltd., Shenzhen (CN)

(72) Inventors: Hong Zhang, Shenzhen (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,895

(22) Filed: Sep. 9, 2022

(65) Prior Publication Data

US 2023/0077431 A1 Mar. 16, 2023

Related U.S. Application Data

(63) Continuation of application No. 17/122,844, filed on Dec. 15, 2020, now Pat. No. 11,490,115, which is a
(Continued)

(30) Foreign Application Priority Data

May 15, 2015 (CN) .......................... 201510249484.8

(51) Int. Cl.
H04N 19/52 (2014.01)
H04N 19/119 (2014.01)
(Continued)

(52) U.S. Cl.
CPC ......... *H04N 19/521* (2014.11); *H04N 19/119* (2014.11); *H04N 19/139* (2014.11);
(Continued)

(58) Field of Classification Search
CPC .. H04N 19/521; H04N 19/119; H04N 19/139; H04N 19/176; H04N 19/196;
(Continued)

(56) References Cited

U.S. PATENT DOCUMENTS

| 5,654,771 A | 8/1997 | Tekalp |
| 6,084,908 A | 7/2000 | Chiang et al. |

(Continued)

FOREIGN PATENT DOCUMENTS

| CN | 1325220 A | 12/2001 |
| CN | 1684517 A | 10/2005 |

(Continued)

OTHER PUBLICATIONS

Huang, Han et al., "Control-Point Representation and Differential Coding Affine-Motion Compensation," IEEE Transactions on Circuits and Systems for Video Technology, vol. 23, No. 10, Oct. 31, 2013, 10 pages.

(Continued)

*Primary Examiner* — Dominic D Saltarelli
(74) *Attorney, Agent, or Firm* — Slater Matsil, LLP

(57) ABSTRACT

The present disclosure provides a video picture coding method, a video picture decoding method, a coding device, and a decoding device. The method includes: determining a distance between control points for an affine picture block; determining a motion vector difference for the affine picture block, motion vectors of the control points being used to determine the motion vector difference; and performing coding processing on the affine picture block over a size that includes a horizontal length and a vertical length, wherein
(Continued)

the horizontal length and the vertical length vary based on the distance between the control points, the motion vector difference, and a motion vector precision.

20 Claims, 11 Drawing Sheets

Related U.S. Application Data continuation of application No. 16/505,182, filed on Jul. 8, 2019, now Pat. No. 10,887,618, which is a continuation of application No. 15/812,719, filed on Nov. 14, 2017, now Pat. No. 10,390,036, which is a continuation of application No. PCT/CN2016/077784, filed on Mar. 30, 2016.

(51) Int. Cl.
| | | |
|---|---|---|
| H04N 19/139 | (2014.01) | |
| H04N 19/176 | (2014.01) | |
| H04N 19/196 | (2014.01) | |
| H04N 19/513 | (2014.01) | |
| H04N 19/53 | (2014.01) | |
| H04N 19/54 | (2014.01) | |
| H04N 19/57 | (2014.01) | |
| H04N 19/573 | (2014.01) | |
| H04N 19/82 | (2014.01) | |

(52) U.S. Cl.
CPC ......... *H04N 19/176* (2014.11); *H04N 19/196* (2014.11); *H04N 19/52* (2014.11); *H04N 19/53* (2014.11); *H04N 19/54* (2014.11); *H04N 19/57* (2014.11); *H04N 19/573* (2014.11); *H04N 19/82* (2014.11)

(58) Field of Classification Search
CPC ........ H04N 19/52; H04N 19/53; H04N 19/54; H04N 19/57; H04N 19/573; H04N 19/82
USPC .................................................... 375/240.16
See application file for complete search history.

(56) References Cited

U.S. PATENT DOCUMENTS

| | | |
|---|---|---|
| 6,208,690 B1 | 3/2001 | Tomizawa |
| 6,775,415 B1 | 8/2004 | Clausen et al. |
| 7,408,986 B2 | 8/2008 | Winder |
| 10,554,965 B2* | 2/2020 | Wang .................. H04N 19/176 |
| 11,172,217 B2 | 11/2021 | Chen et al. |
| 2002/0034250 A1 | 3/2002 | Yoo |
| 2005/0226335 A1 | 10/2005 | Lee et al. |
| 2005/0265453 A1 | 12/2005 | Saito |
| 2009/0257498 A1 | 10/2009 | Kurata |
| 2010/0329347 A1 | 12/2010 | Kim et al. |
| 2012/0039387 A1 | 2/2012 | Ha et al. |
| 2013/0301716 A1 | 11/2013 | Zheng et al. |
| 2013/0329799 A1 | 12/2013 | Lin et al. |
| 2014/0269923 A1 | 9/2014 | Kwon et al. |
| 2014/0307798 A1* | 10/2014 | Taubman ............... H04N 19/61 |
| | | 375/240.16 |
| 2014/0341290 A1 | 11/2014 | Merkle et al. |
| 2014/0355684 A1 | 12/2014 | Narroschke et al. |
| 2015/0103363 A1 | 4/2015 | Kawano |
| 2016/0316220 A1 | 10/2016 | Zhao et al. |
| 2017/0013279 A1* | 1/2017 | Puri ...................... H04N 19/85 |
| 2017/0188041 A1 | 6/2017 | Li et al. |

FOREIGN PATENT DOCUMENTS

| | | |
|---|---|---|
| CN | 1961582 A | 5/2007 |
| CN | 102547261 A | 7/2012 |
| CN | 102611884 A | 7/2012 |
| CN | 104053001 A | 9/2014 |
| CN | 104363451 A | 2/2015 |
| CN | 104539966 A | 4/2015 |
| EP | 1158806 A1 | 11/2001 |
| EP | 1274254 A2 | 1/2003 |
| JP | 2000511366 A | 8/2000 |
| JP | 2006187025 A | 7/2006 |
| JP | 2014236510 A | 12/2014 |
| RU | 2533852 C2 | 11/2014 |
| WO | 9717797 A2 | 5/1997 |
| WO | 2011070730 A1 | 6/2011 |
| WO | 2011128366 A1 | 10/2011 |
| WO | 2013068548 A2 | 5/2013 |
| WO | 2015006894 A1 | 1/2015 |

OTHER PUBLICATIONS

Huang, Han et al., "Affine Skip and Direct Modes for Efficient Video Coding," Visual Communications and Image Processing (VCIP), 2012 IEEE, IEEE, Nov. 27, 2012, 6 pages.

Zhang, Na et al., "Motion Vector Derivation of Deformable Block," Image Processing (ICIP), 2012 19th IEEE International Conference. pp. 1549-1552.

* cited by examiner

S1101

```
Determine a first horizontal component difference and a first vertical
component difference between the motion vectors of the first control
             point and the second control point
```
— S1103

```
 Determine a larger one of the first horizontal component difference
and the first vertical component difference as the first component of
                  the motion vector difference
```
— S1104

```
  Determine a second horizontal component difference and a second
vertical component difference between the motion vectors of the third
             control point and the fourth control point
```
— S1105

```
Determine a larger one of the second horizontal component difference
     and the second vertical component difference as the second
            component of the motion vector difference
```
— S1106

FIG. 4

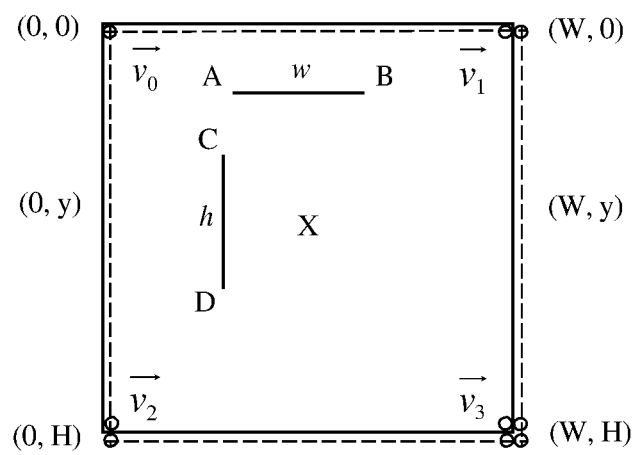

```
┌─────────────────────────────────────────────────────┐
│ Determine a ratio of a product of the motion vector │
│ precision and the first horizontal distance to the  │
│ first component of the motion vector difference as  │
│ a length of the affine motion compensation picture  │──── S1301
│ subblock in a horizontal direction                  │
└─────────────────────────────────────────────────────┘
                           │
┌─────────────────────────────────────────────────────┐
│ Determine a ratio of a product of the motion vector │
│ precision and the first vertical distance to the    │
│ second component of the motion vector difference as │──── S1302
│ a length of the affine motion compensation picture  │
│ subblock in a vertical direction                    │
└─────────────────────────────────────────────────────┘
```

When a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than a first preset value, determine the first preset value as a length of the affine motion compensation picture subblock in a horizontal direction ──── S1303

When a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than a second preset value, determine the second preset value as a length of the affine motion compensation picture subblock in a vertical direction ──── S1304

| Determine a motion vector of each affine motion compensation picture subblock in the affine motion compensation picture subblocks | — S1401 |

| Determine a motion compensation prediction signal of each affine motion compensation picture subblock according to the motion vector of each affine motion compensation picture subblock | — S1402 |

| Determine a prediction residual signal of each affine motion compensation picture subblock according to the motion compensation prediction signal of each affine motion compensation picture subblock | — S1403 |

| Code the prediction residual signal of each affine motion compensation picture subblock | — S1404 |

FIG. 10

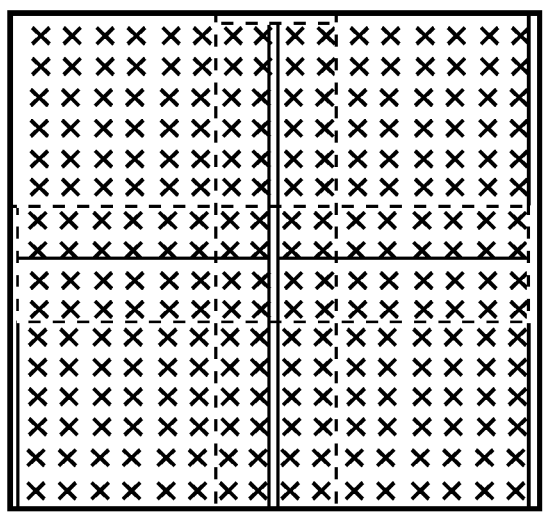

```
┌─────────────────────────────────────────────────────────────┐
│ Determine a first horizontal component difference and a first vertical │
│ component difference between the motion vectors of the first control  │  ~ S2103
│              point and the second control point                       │
└─────────────────────────────────────────────────────────────┘
                              │
┌─────────────────────────────────────────────────────────────┐
│ Determine a larger one of the first horizontal component difference   │
│ and the first vertical component difference as the first component of │  ~ S2104
│                  the motion vector difference                         │
└─────────────────────────────────────────────────────────────┘
```

```
┌─────────────────────────────────────────────────────────────┐
│ Determine a second horizontal component difference and a second       │
│ vertical component difference between the motion vectors of the third │  ~ S2105
│              control point and the fourth control point               │
└─────────────────────────────────────────────────────────────┘
                              │
┌─────────────────────────────────────────────────────────────┐
│ Determine a larger one of the second horizontal component difference  │
│ and the second vertical component difference as the second            │  ~ S2106
│              component of the motion vector difference                │
└─────────────────────────────────────────────────────────────┘
```

```
┌─────────────────────────────────────────────────────────────┐
│ Determine a ratio of a product of the motion vector precision and the │
│ first horizontal distance to the first component of the motion vector │
│ difference as a length of the affine motion compensation picture      │  ~ S2301
│                subblock in a horizontal direction                     │
└─────────────────────────────────────────────────────────────┘
                              │
┌─────────────────────────────────────────────────────────────┐
│ Determine a ratio of a product of the motion vector precision and the │
│ first vertical distance to the second component of the motion vector  │
│ difference as a length of the affine motion compensation picture      │  ~ S2302
│                 subblock in a vertical direction                      │
└─────────────────────────────────────────────────────────────┘
```

When a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than a first preset value, determine the first preset value as a length of the affine motion compensation picture subblock in a horizontal direction ~ S2303

When a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than a second preset value, determine the second preset value as a length of the affine motion compensation picture subblock in a vertical direction ~ S2304

ADAPTIVE AFFINE MOTION COMPENSATION UNIT DETERMINING IN VIDEO PICTURE CODING METHOD, VIDEO PICTURE DECODING METHOD, CODING DEVICE, AND DECODING DEVICE

CROSS-REFERENCE TO RELATED APPLICATIONS

This application is a continuation of U.S. patent application Ser. No. 17/122,844, filed on Dec. 15, 2020, which is a continuation of U.S. patent application Ser. No. 16/505,182, filed on Jul. 8, 2019, now U.S. Pat. No. 10,887,618, which is a continuation of U.S. patent application Ser. No. 15/812,719, filed on Nov. 14, 2017, now U.S. Pat. No. 10,390,036, which is a continuation of International Application No. PCT/CN2016/077784, filed on Mar. 30, 2016, which claims priority to Chinese Patent Application No. 201510249484.8, filed on May 15, 2015. All of the afore-mentioned patent applications are hereby incorporated by reference in their entireties.

TECHNICAL FIELD

The present disclosure relates to the field of video picture processing, and in particular, to adaptive affine motion compensation unit determining in a video picture coding method, a video picture decoding method, a coding device, and a decoding device.

BACKGROUND

As Internet technologies develop rapidly and material and spiritual cultures of people become richer, there are more requirements for video applications on the Internet, and in particular, requirements for high-definition video applications. However, a data volume of a high-definition video is huge, and a problem of compression coding of the high-definition video needs to be first resolved, so that the high-definition video can be transmitted on the bandwidth-limited Internet. Currently, two international organizations: the Motion Picture Experts Group ("MPEG" for short) under the International Organization for Standardization ("ISO" for short)/International Electrotechnical Commission ("IEC" for short) and the Video Coding Experts Group ("VCEG" for short) under the International Telecommunication Union-Telecommunication Standardization Sector ("ITU-T" for short), are dedicated to developing international video coding standards. Established in 1986, the MPEG is dedicated to developing related standards in the multimedia field, where the standards are mainly applied to storage, broadcast and television, streaming media on the Internet or a wireless network, or the like. The ITU-T mainly develops video coding standards oriented to the real-time video communications field, such as videophone and videoconference applications.

In the past decades, international video coding standards oriented to various applications have been successfully developed, mainly including: the MPEG-1 standard applied to a video compact disc ("VCD" for short), the MPEG-2 standard applied to a digital versatile disc ("DVD" for short) and digital video broadcasting ("DVB" for short), the H.261 standard, H.263 standard, and H.264 standard applied to videoconferencing, the MPEG-4 standard allowing coding of an object in any form, and the latest High Efficiency Video Coding ("HEVC" for short) standard.

In comparison with the latest video coding standard HEVC, for a sequence including rotational or scaling motion, a motion compensation prediction technology based on a linearly changing motion vector field can improve coding efficiency significantly. In a conventional motion compensation prediction technology based on affine transformation, after an affine transformation parameter of a picture block is obtained, a motion vector of each pixel in the picture block needs to be computed, motion compensation prediction is performed according to the motion vector of each pixel, and therefore, a motion compensation prediction signal of each pixel is obtained. Because the motion vector of each pixel in the picture block may vary, different operations need to be performed on the pixels according to the motion vectors. Complexity of pixel-based motion compensation prediction is very high. To reduce coding/decoding complexity, a related technology tries further dividing a picture block into picture subblocks, obtaining a motion vector of each picture subblock, and then obtaining a motion compensation prediction signal of each picture subblock.

However, in the related technology, sizes of the picture subblocks are fixed. If the picture subblocks are excessively small, relatively high coding/decoding complexity is caused. If the picture subblocks are excessively large, coding/decoding efficiency is reduced.

SUMMARY

The present disclosure provides a video picture coding method, a video picture decoding method, a coding device, and a decoding device to reduce coding/decoding complexity and improve coding/decoding efficiency by selecting a picture subblock of an appropriate size.

According to a first aspect, a video picture coding method is provided and includes: determining a motion vector difference of an affine picture block; determining motion vector precision of the affine picture block; determining a size of an affine motion compensation picture subblock in the affine picture block according to the motion vector difference, the motion vector precision, and a distance between control points in the affine picture block, where the control points are pixels used to determine the motion vector difference; and performing coding processing on the affine picture block according to the size of the affine motion compensation picture subblock.

With reference to the first aspect, in a first possible implementation of the first aspect, the determining a motion vector difference of an affine picture block includes: determining a first component of the motion vector difference according to a difference between motion vectors of a first control point and a second control point that are located on a same horizontal line; and determining a second component of the motion vector difference according to a difference between motion vectors of a third control point and a fourth control point that are located on a same vertical line; where a first horizontal distance exists between the first control point and the second control point, and a first vertical distance exists between the third control point and the fourth control point.

With reference to the first possible implementation of the first aspect, in a second possible implementation of the first aspect, the determining a first component of the motion vector difference according to a difference between motion vectors of a first control point and a second control point that are located on a same horizontal line includes: determining a first horizontal component difference and a first vertical component difference between the motion vectors of the first control point and the second control point; and determining a larger one of the first horizontal component difference and the first vertical component difference as the first component of the motion vector difference; and the determining a second component of the motion vector difference according to a difference between motion vectors of a third control point and a fourth control point that are located on a same vertical line includes: determining a second horizontal component difference and a second vertical component difference between the motion vectors of the third control point and the fourth control point; and determining a larger one of the second horizontal component difference and the second vertical component difference as the second component of the motion vector difference.

With reference to the second possible implementation of the first aspect, in a third possible implementation of the first aspect, the method further includes: determining an affine transformation parameter of a pixel in the affine picture block, where pixels in the affine picture block have the same affine transformation parameter; the determining a first horizontal component difference and a first vertical component difference between the motion vectors of the first control point and the second control point includes: determining the first horizontal component difference and the first vertical component difference according to the affine transformation parameter and the first horizontal distance; and the determining a second horizontal component difference and a second vertical component difference between the motion vectors of the third control point and the fourth control point includes: determining the second horizontal component difference and the second vertical component difference according to the affine transformation parameter and the first vertical distance.

With reference to the second possible implementation of the first aspect, in a fourth possible implementation of the first aspect, the method further includes: determining a motion vector of the first control point, a motion vector of the second control point, a motion vector of the third control point, and a motion vector of the fourth control point; the determining a first horizontal component difference and a first vertical component difference between the motion vectors of the first control point and the second control point includes: determining a difference between a horizontal component of the motion vector of the first control point and a horizontal component of the motion vector of the second control point as the first horizontal component difference; and determining a difference between a vertical component of the motion vector of the first control point and a vertical component of the motion vector of the second control point as the first vertical component difference; and the determining a second horizontal component difference and a second vertical component difference between the motion vectors of the third control point and the fourth control point includes: determining a difference between a horizontal component of the motion vector of the third control point and a horizontal component of the motion vector of the fourth control point as the second horizontal component difference; and determining a difference between a vertical component of the motion vector of the third control point and a vertical component of the motion vector of the fourth control point as the second vertical component difference.

With reference to the second possible implementation of the first aspect, in a fifth possible implementation of the first aspect, the first control point and the second control point are two adjacent pixels, and the third control point and the fourth control point are two adjacent pixels; and the determining a first horizontal component difference and a first vertical component difference between the motion vectors of the first control point and the second control point, and the determining a second horizontal component difference and a second vertical component difference between the motion vectors of the third control point and the fourth control point include: determining a motion vector of a first pixel, a motion vector of a second pixel, and a motion vector of a third pixel, where the first pixel, the second pixel, and the third pixel are non-overlapping pixels; determining a second horizontal distance and a second vertical distance between the first pixel and the second pixel; determining a third horizontal distance and a third vertical distance between the first pixel and the third pixel; and determining the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

With reference to any one of the third to the fifth possible implementations of the first aspect, in a sixth possible implementation of the first aspect, the determining a size of an affine motion compensation picture subblock according to the motion vector difference, the motion vector precision, and a distance between control points in the affine picture block includes: determining a ratio of a product of the motion vector precision and the first horizontal distance to the first component of the motion vector difference as a length of the affine motion compensation picture subblock in a horizontal direction; and determining a ratio of a product of the motion vector precision and the first vertical distance to the second component of the motion vector difference as a length of the affine motion compensation picture subblock in a vertical direction.

With reference to any one of the third to the fifth possible implementations of the first aspect, in a seventh possible implementation of the first aspect, the determining a size of an affine motion compensation picture subblock in the affine picture block according to the motion vector difference, the motion vector precision, and a distance between control points in the affine picture block includes: when a ratio of a product of the motion vector precision and the first horizontal distance to the first component of the motion vector difference is greater than or equal to a first preset value, determining the ratio as a length of the affine motion compensation picture subblock in a horizontal direction; or when a ratio of a product of the motion vector precision and the first horizontal distance to the first component of the motion vector difference is less than the first preset value, determining the first preset value as a length of the affine motion compensation picture subblock in a horizontal direction; and when a ratio of a product of the motion vector precision and the first vertical distance to the second component of the motion vector difference is greater than or equal to a second preset value, determining the ratio as a length of the affine motion compensation picture subblock in a vertical direction; or when a ratio of a product of the motion vector precision and the first vertical distance to the second component of the motion vector difference is less than the second preset value, determining the second preset value as a length of the affine motion compensation picture subblock in a vertical direction.

With reference to any one of the first to the seventh possible implementations of the first aspect, in an eighth possible implementation of the first aspect, the first control point and the third control point are the same pixel.

With reference to any one of the first to the eighth possible implementations of the first aspect, in a ninth possible implementation of the first aspect, the first control point, the second control point, the third control point, and the fourth control point are vertices of the affine picture block.

With reference to the seventh possible implementation of the first aspect, in a tenth possible implementation of the first aspect, the first preset value is 4, and/or the second preset value is 4.

With reference to any one of the first aspect, or the first to the tenth possible implementations of the first aspect, in an eleventh possible implementation of the first aspect, the determining motion vector precision of the affine picture block includes: determining a third preset value as the motion vector precision of the affine picture block; or determining the motion vector precision of the affine picture block according to a feature of a picture block adjacent to the affine picture block, where the adjacent picture block is a picture block spatially and/or temporally adjacent to the affine picture block.

With reference to any one of the first aspect, or the first to the eleventh possible implementations of the first aspect, in a twelfth possible implementation of the first aspect, the performing coding processing on the affine picture block according to the size of the affine motion compensation picture subblock includes: determining a motion vector of each affine motion compensation picture subblock in the affine motion compensation picture subblocks; determining a motion compensation prediction signal of each affine motion compensation picture subblock according to the motion vector of each affine motion compensation picture subblock; determining a prediction residual signal of each affine motion compensation picture subblock according to the motion compensation prediction signal of each affine motion compensation picture subblock; and coding the prediction residual signal of each affine motion compensation picture subblock.

With reference to the twelfth possible implementation of the first aspect, in a thirteenth possible implementation of the first aspect, the method further includes: filtering signals of boundary pixels of each affine motion compensation picture subblock, where the boundary pixels are pixels in one or more rows at a boundary of each affine motion compensation picture subblock.

With reference to the thirteenth possible implementation of the first aspect, in a fourteenth possible implementation of the first aspect, the signal of the boundary pixel includes a motion compensation prediction signal and/or a reconstructed signal, and the reconstructed signal is a sum of the motion compensation prediction signal and a reconstructed residual signal.

According to a second aspect, a video picture decoding method is provided and includes: determining a motion vector difference of an affine picture block; determining motion vector precision of the affine picture block; determining a size of an affine motion compensation picture subblock in the affine picture block according to the motion vector difference, the motion vector precision, and a distance between control points in the affine picture block, where the control points are pixels used to determine the motion vector difference; and performing decoding processing on the affine picture block according to the size of the affine motion compensation picture subblock.

With reference to the second aspect, in a first possible implementation of the second aspect, the determining a motion vector difference of an affine picture block includes: determining a first component of the motion vector difference according to a difference between motion vectors of a first control point and a second control point that are located on a same horizontal line; and determining a second component of the motion vector difference according to a difference between motion vectors of a third control point and a fourth control point that are located on a same vertical line; where a first horizontal distance exists between the first control point and the second control point, and a first vertical distance exists between the third control point and the fourth control point.

With reference to the first possible implementation of the second aspect, in a second possible implementation of the second aspect, the determining a first component of the motion vector difference according to a difference between motion vectors of a first control point and a second control point that are located on a same horizontal line includes: determining a first horizontal component difference and a first vertical component difference between the motion vectors of the first control point and the second control point; and determining a larger one of the first horizontal component difference and the first vertical component difference as the first component of the motion vector difference; and the determining a second component of the motion vector difference according to a difference between motion vectors of a third control point and a fourth control point that are located on a same vertical line includes: determining a second horizontal component difference and a second vertical component difference between the motion vectors of the third control point and the fourth control point; and determining a larger one of the second horizontal component difference and the second vertical component difference as the second component of the motion vector difference.

With reference to the second possible implementation of the second aspect, in a third possible implementation of the second aspect, the method further includes: determining an affine transformation parameter of a pixel in the affine picture block, where pixels in the affine picture block have the same affine transformation parameter; the determining a first horizontal component difference and a first vertical component difference between the motion vectors of the first control point and the second control point includes: determining the first horizontal component difference and the first vertical component difference according to the affine transformation parameter and the first horizontal distance; and the determining a second horizontal component difference and a second vertical component difference between the motion vectors of the third control point and the fourth control point includes: determining the second horizontal component difference and the second vertical component difference according to the affine transformation parameter and the first vertical distance.

With reference to the second possible implementation of the second aspect, in a fourth possible implementation of the second aspect, the method further includes: determining a motion vector of the first control point, a motion vector of the second control point, a motion vector of the third control point, and a motion vector of the fourth control point; the determining a first horizontal component difference and a first vertical component difference between the motion vectors of the first control point and the second control point includes: determining a difference between a horizontal component of the motion vector of the first control point and a horizontal component of the motion vector of the second control point as the first horizontal component difference; and determining a difference between a vertical component of the motion vector of the first control point and a vertical component of the motion vector of the second control point as the first vertical component difference; and the determining a second horizontal component difference and a second vertical component difference between the motion vectors of the third control point and the fourth control point includes: determining a difference between a horizontal component of the motion vector of the third control point and a horizontal component of the motion vector of the fourth control point as the second horizontal component difference; and determining a difference between a vertical component of the motion vector of the third control point and a vertical component of the motion vector of the fourth control point as the second vertical component difference.

With reference to the second possible implementation of the second aspect, in a fifth possible implementation of the second aspect, the first control point and the second control point are two adjacent pixels, and the third control point and the fourth control point are two adjacent pixels; and the determining a first horizontal component difference and a first vertical component difference between the motion vectors of the first control point and the second control point, and the determining a second horizontal component difference and a second vertical component difference between the motion vectors of the third control point and the fourth control point include: determining a motion vector of a first pixel, a motion vector of a second pixel, and a motion vector of a third pixel, where the first pixel, the second pixel, and the third pixel are non-overlapping pixels; determining a second horizontal distance and a second vertical distance between the first pixel and the second pixel; determining a third horizontal distance and a third vertical distance between the first pixel and the third pixel; and determining the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

With reference to any one of the third to the fifth possible implementations of the second aspect, in a sixth possible implementation of the second aspect, the determining a size of an affine motion compensation picture subblock according to the motion vector difference, the motion vector precision, and a distance between control points in the affine picture block includes: determining a ratio of a product of the motion vector precision and the first horizontal distance to the first component of the motion vector difference as a length of the affine motion compensation picture subblock in a horizontal direction; and determining a ratio of a product of the motion vector precision and the first vertical distance to the second component of the motion vector difference as a length of the affine motion compensation picture subblock in a vertical direction.

With reference to any one of the third to the fifth possible implementations of the second aspect, in a seventh possible implementation of the second aspect, the determining a size of an affine motion compensation picture subblock in the affine picture block according to the motion vector difference, the motion vector precision, and a distance between control points in the affine picture block includes: when a ratio of a product of the motion vector precision and the first horizontal distance to the first component of the motion vector difference is greater than or equal to a first preset value, determining the ratio as a length of the affine motion compensation picture subblock in a horizontal direction; or when a ratio of a product of the motion vector precision and the first horizontal distance to the first component of the motion vector difference is less than the first preset value, determining the first preset value as a length of the affine motion compensation picture subblock in a horizontal direction; and when a ratio of a product of the motion vector precision and the first vertical distance to the second component of the motion vector difference is greater than or equal to a second preset value, determining the ratio as a length of the affine motion compensation picture subblock in a vertical direction; or when a ratio of a product of the motion vector precision and the first vertical distance to the second component of the motion vector difference is less than the second preset value, determining the second preset value as a length of the affine motion compensation picture subblock in a vertical direction.

With reference to any one of the first to the seventh possible implementations of the second aspect, in an eighth possible implementation of the second aspect, the first control point and the third control point are the same pixel.

With reference to any one of the first to the eighth possible implementations of the second aspect, in a ninth possible implementation of the second aspect, the first control point, the second control point, the third control point, and the fourth control point are vertices of the affine picture block.

With reference to the seventh possible implementation of the second aspect, in a tenth possible implementation of the second aspect, the first preset value is 4, and/or the second preset value is 4.

With reference to any one of the second aspect, or the first to the tenth possible implementations of the second aspect, in an eleventh possible implementation of the second aspect, the determining motion vector precision of the affine picture block includes: determining a third preset value as the motion vector precision of the affine picture block; or determining the motion vector precision of the affine picture block according to a feature of a picture block adjacent to the affine picture block, where the adjacent picture block is a picture block spatially and/or temporally adjacent to the affine picture block.

With reference to any one of the second aspect, or the first to the eleventh possible implementations of the second aspect, in a twelfth possible implementation of the second aspect, the performing decoding processing on the affine picture block according to the size of the affine motion compensation picture subblock includes: determining a motion vector of each affine motion compensation picture subblock in the affine motion compensation picture subblocks; determining a motion compensation prediction signal of each affine motion compensation picture subblock according to the motion vector of each affine motion compensation picture subblock; determining a prediction residual signal of each affine motion compensation picture subblock according to the motion compensation prediction signal of each affine motion compensation picture subblock; and decoding the prediction residual signal of each affine motion compensation picture subblock.

With reference to the twelfth possible implementation of the second aspect, in a thirteenth possible implementation of the second aspect, the method further includes: filtering signals of boundary pixels of each affine motion compensation picture subblock, where the boundary pixels are pixels in one or more rows at a boundary of each affine motion compensation picture subblock.

With reference to the thirteenth possible implementation of the second aspect, in a fourteenth possible implementation of the second aspect, the signal of the boundary pixel includes a motion compensation prediction signal and/or a reconstructed signal, and the reconstructed signal is a sum of the motion compensation prediction signal and a reconstructed residual signal.

According to a third aspect, a coding device is provided and includes: a first determining module, configured to determine a motion vector difference of an affine picture block; a second determining module, configured to determine motion vector precision of the affine picture block; a third determining module, configured to determine a size of an affine motion compensation picture subblock in the affine picture block according to the motion vector difference determined by the first determining module, the motion vector precision determined by the second determining module, and a distance between control points in the affine picture block, where the control points are pixels used to determine the motion vector difference; and a coding module, configured to perform coding processing on the affine picture block according to the size of the affine motion compensation picture subblock that is determined by the third determining module.

With reference to the third aspect, in a first possible implementation of the third aspect, the first determining module is specifically configured to: determine a first component of the motion vector difference according to a difference between motion vectors of a first control point and a second control point that are located on a same horizontal line; and determine a second component of the motion vector difference according to a difference between motion vectors of a third control point and a fourth control point that are located on a same vertical line; where a first horizontal distance exists between the first control point and the second control point, and a first vertical distance exists between the third control point and the fourth control point.

With reference to the first possible implementation of the third aspect, in a second possible implementation of the third aspect, the first determining module is specifically configured to: determine a first horizontal component difference and a first vertical component difference between the motion vectors of the first control point and the second control point; determine a larger one of the first horizontal component difference and the first vertical component difference as the first component of the motion vector difference; determine a second horizontal component difference and a second vertical component difference between the motion vectors of the third control point and the fourth control point; and determine a larger one of the second horizontal component difference and the second vertical component difference as the second component of the motion vector difference.

With reference to the second possible implementation of the third aspect, in a third possible implementation of the third aspect, the first determining module is specifically configured to: determine an affine transformation parameter of a pixel in the affine picture block, where pixels in the affine picture block have the same affine transformation parameter; determine the first horizontal component difference and the first vertical component difference according to the affine transformation parameter and the first horizontal distance; and determine the second horizontal component difference and the second vertical component difference according to the affine transformation parameter and the first vertical distance.

With reference to the second possible implementation of the third aspect, in a fourth possible implementation of the third aspect, the first determining module is specifically configured to: determine a motion vector of the first control point, a motion vector of the second control point, a motion vector of the third control point, and a motion vector of the fourth control point; determine a difference between a horizontal component of the motion vector of the first control point and a horizontal component of the motion vector of the second control point as the first horizontal component difference; determine a difference between a vertical component of the motion vector of the first control point and a vertical component of the motion vector of the second control point as the first vertical component difference; determine a difference between a horizontal component of the motion vector of the third control point and a horizontal component of the motion vector of the fourth control point as the second horizontal component difference; and determine a difference between a vertical component of the motion vector of the third control point and a vertical component of the motion vector of the fourth control point as the second vertical component difference.

With reference to the second possible implementation of the third aspect, in a fifth possible implementation of the third aspect, the first control point and the second control point are two adjacent pixels, and the third control point and the fourth control point are two adjacent pixels; and the first determining module is specifically configured to: determine a motion vector of a first pixel, a motion vector of a second pixel, and a motion vector of a third pixel, where the first pixel, the second pixel, and the third pixel are non-overlapping pixels; determine a second horizontal distance and a second vertical distance between the first pixel and the second pixel; determine a third horizontal distance and a third vertical distance between the first pixel and the third pixel; and determine the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

With reference to any one of the third to the fifth possible implementations of the third aspect, in a sixth possible implementation of the third aspect, the third determining module is specifically configured to: determine a ratio of a product of the motion vector precision and the first horizontal distance to the first component of the motion vector difference as a length of the affine motion compensation picture subblock in a horizontal direction; and determine a ratio of a product of the motion vector precision and the first vertical distance to the second component of the motion vector difference as a length of the affine motion compensation picture subblock in a vertical direction.

With reference to any one of the third to the fifth possible implementations of the third aspect, in a seventh possible implementation of the third aspect, the third determining module is specifically configured to: when a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than the first preset value, determine the first preset value as a length of the affine motion compensation picture subblock in a horizontal direction; and when a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than the second preset value, determine the second preset value as a length of the affine motion compensation picture subblock in a vertical direction.

With reference to any one of the first to the seventh possible implementations of the third aspect, in an eighth possible implementation of the third aspect, the first control point and the third control point are the same pixel.

With reference to any one of the first to the eighth possible implementations of the third aspect, in a ninth possible implementation of the third aspect, the first control point, the second control point, the third control point, and the fourth control point are vertices of the affine picture block.

With reference to the seventh possible implementation of the third aspect, in a tenth possible implementation of the third aspect, the first preset value is 4, and/or the second preset value is 4.

With reference to any one of the third aspect, or the first to the tenth possible implementations of the third aspect, in an eleventh possible implementation of the third aspect, the second determining module is specifically configured to: determine a third preset value as the motion vector precision of the affine picture block; or determine the motion vector precision of the affine picture block according to a feature of a picture block adjacent to the affine picture block, where the adjacent picture block is a picture block spatially and/or temporally adjacent to the affine picture block.

With reference to any one of the third aspect, or the first to the eleventh possible implementations of the third aspect, in a twelfth possible implementation of the third aspect, the coding module is specifically configured to: determine a motion vector of each affine motion compensation picture subblock in the affine motion compensation picture subblocks; determine a motion compensation prediction signal of each affine motion compensation picture subblock according to the motion vector of each affine motion compensation picture subblock; determine a prediction residual signal of each affine motion compensation picture subblock according to the motion compensation prediction signal of each affine motion compensation picture subblock; and code the prediction residual signal of each affine motion compensation picture subblock.

With reference to the twelfth possible implementation of the third aspect, in a thirteenth possible implementation of the third aspect, the coding device further includes: a filtering module, configured to filter signals of boundary pixels of each affine motion compensation picture subblock, where the boundary pixels are pixels in one or more rows at a boundary of each affine motion compensation picture subblock.

With reference to the thirteenth possible implementation of the third aspect, in a fourteenth possible implementation of the third aspect, the signal of the boundary pixel includes a motion compensation prediction signal and/or a reconstructed signal, and the reconstructed signal is a sum of the motion compensation prediction signal and a reconstructed residual signal.

According to a fourth aspect, a decoding device is provided and includes: a first determining module, configured to determine a motion vector difference of an affine picture block; a second determining module, configured to determine motion vector precision of the affine picture block; a third determining module, configured to determine a size of an affine motion compensation picture subblock in the affine picture block according to the motion vector difference determined by the first determining module, the motion vector precision determined by the second determining module, and a distance between control points in the affine picture block, where the control points are pixels used to determine the motion vector difference; and a decoding module, configured to perform decoding processing on the affine picture block according to the size of the affine motion compensation picture subblock that is determined by the third determining module.

With reference to the fourth aspect, in a first possible implementation of the fourth aspect, the first determining module is specifically configured to: determine a first component of the motion vector difference according to a difference between motion vectors of a first control point and a second control point that are located on a same horizontal line; and determine a second component of the motion vector difference according to a difference between motion vectors of a third control point and a fourth control point that are located on a same vertical line; where a first horizontal distance exists between the first control point and the second control point, and a first vertical distance exists between the third control point and the fourth control point.

With reference to the first possible implementation of the fourth aspect, in a second possible implementation of the fourth aspect, the first determining module is specifically configured to: determine a first horizontal component difference and a first vertical component difference between the motion vectors of the first control point and the second control point; determine a larger one of the first horizontal component difference and the first vertical component difference as the first component of the motion vector difference; determine a second horizontal component difference and a second vertical component difference between the motion vectors of the third control point and the fourth control point; and determine a larger one of the second horizontal component difference and the second vertical component difference as the second component of the motion vector difference.

With reference to the second possible implementation of the fourth aspect, in a third possible implementation of the fourth aspect, the first determining module is specifically configured to: determine an affine transformation parameter of a pixel in the affine picture block, where pixels in the affine picture block have the same affine transformation parameter; determine the first horizontal component difference and the first vertical component difference according to the affine transformation parameter and the first horizontal distance; and determine the second horizontal component difference and the second vertical component difference according to the affine transformation parameter and the first vertical distance.

With reference to the second possible implementation of the fourth aspect, in a fourth possible implementation of the fourth aspect, the first determining module is specifically configured to: determine a motion vector of the first control point, a motion vector of the second control point, a motion vector of the third control point, and a motion vector of the fourth control point; determine a difference between a horizontal component of the motion vector of the first control point and a horizontal component of the motion vector of the second control point as the first horizontal component difference; determine a difference between a vertical component of the motion vector of the first control point and a vertical component of the motion vector of the second control point as the first vertical component difference; determine a difference between a horizontal component of the motion vector of the third control point and a horizontal component of the motion vector of the fourth control point as the second horizontal component difference; and determine a difference between a vertical component of the motion vector of the third control point and a vertical component of the motion vector of the fourth control point as the second vertical component difference.

With reference to the second possible implementation of the fourth aspect, in a fifth possible implementation of the fourth aspect, the first control point and the second control point are two adjacent pixels, and the third control point and the fourth control point are two adjacent pixels; and the first determining module is specifically configured to: determine a motion vector of a first pixel, a motion vector of a second pixel, and a motion vector of a third pixel, where the first pixel, the second pixel, and the third pixel are non-overlapping pixels; determine a second horizontal distance and a second vertical distance between the first pixel and the second pixel; determine a third horizontal distance and a third vertical distance between the first pixel and the third pixel; and determine the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

With reference to any one of the third to the fifth possible implementations of the fourth aspect, in a sixth possible implementation of the fourth aspect, the third determining module is specifically configured to: determine a ratio of a product of the motion vector precision and the first horizontal distance to the first component of the motion vector difference as a length of the affine motion compensation picture subblock in a horizontal direction; and determine a ratio of a product of the motion vector precision and the first vertical distance to the second component of the motion vector difference as a length of the affine motion compensation picture subblock in a vertical direction.

With reference to any one of the third to the fifth possible implementations of the fourth aspect, in a seventh possible implementation of the fourth aspect, the third determining module is specifically configured to: when a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than the first preset value, determine the first preset value as a length of the affine motion compensation picture subblock in a horizontal direction; and when a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than the second preset value, determine the second preset value as a length of the affine motion compensation picture subblock in a vertical direction.

With reference to any one of the first to the seventh possible implementations of the fourth aspect, in an eighth possible implementation of the fourth aspect, the first control point and the third control point are the same pixel.

With reference to any one of the first to the eighth possible implementations of the fourth aspect, in a ninth possible implementation of the fourth aspect, the first control point, the second control point, the third control point, and the fourth control point are vertices of the affine picture block.

With reference to the seventh possible implementation of the fourth aspect, in a tenth possible implementation of the fourth aspect, the first preset value is 4, and/or the second preset value is 4.

With reference to any one of the fourth aspect, or the first to the tenth possible implementations of the fourth aspect, in an eleventh possible implementation of the fourth aspect, the second determining module is specifically configured to: determine a third preset value as the motion vector precision of the affine picture block; or determine the motion vector precision of the affine picture block according to a feature of a picture block adjacent to the affine picture block, where the adjacent picture block is a picture block spatially and/or temporally adjacent to the affine picture block.

With reference to any one of the fourth aspect, or the first to the eleventh possible implementations of the fourth aspect, in a twelfth possible implementation of the fourth aspect, the decoding module is specifically configured to: determine a motion vector of each affine motion compensation picture subblock in the affine motion compensation picture subblocks; determine a motion compensation prediction signal of each affine motion compensation picture subblock according to the motion vector of each affine motion compensation picture subblock; determine a prediction residual signal of each affine motion compensation picture subblock according to the motion compensation prediction signal of each affine motion compensation picture subblock; and decode the prediction residual signal of each affine motion compensation picture subblock.

With reference to the twelfth possible implementation of the fourth aspect, in a thirteenth possible implementation of the fourth aspect, the decoding device further includes: a filtering module, configured to filter signals of boundary pixels of each affine motion compensation picture subblock, where the boundary pixels are pixels in one or more rows at a boundary of each affine motion compensation picture subblock.

With reference to the thirteenth possible implementation of the fourth aspect, in a fourteenth possible implementation of the fourth aspect, the signal of the boundary pixel includes a motion compensation prediction signal and/or a reconstructed signal, and the reconstructed signal is a sum of the motion compensation prediction signal and a reconstructed residual signal.

Based on the foregoing technical solutions, according to the video picture coding method, the video picture decoding method, the coding device, and the decoding device in the embodiments of the present invention, a size of an affine motion compensation picture subblock in an affine picture block is determined according to a motion vector difference of the affine picture block, motion vector precision of the affine picture block, and a distance between control points in the affine picture block. In this way, a picture subblock of an appropriate size is selected in a coding/decoding process, so that coding/decoding complexity can be reduced, and coding/decoding efficiency can be improved.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3 is still another schematic flowchart of a video picture coding method according to an embodiment of the present invention;

FIG. 4 is still another schematic flowchart of a video picture coding method according to an embodiment of the present invention;

FIG. 5 is a schematic diagram of an affine picture block and control points according to an embodiment of the present invention;

FIG. 8 is still another schematic flowchart of a video picture coding method according to an embodiment of the present invention;

FIG. 9 is still another schematic flowchart of a video picture coding method according to an embodiment of the present invention;

FIG. 10 is still another schematic flowchart of a video picture coding method according to an embodiment of the present invention;

FIG. 11 is still another schematic diagram of an affine picture block according to an embodiment of the present invention;

FIG. 14 is still another schematic flowchart of a video picture decoding method according to an embodiment of the present invention;

FIG. 15 is still another schematic flowchart of a video picture decoding method according to an embodiment of the present invention;

FIG. 16 is still another schematic flowchart of a video picture decoding method according to an embodiment of the present invention;

FIG. 17 is still another schematic flowchart of a video picture decoding method according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
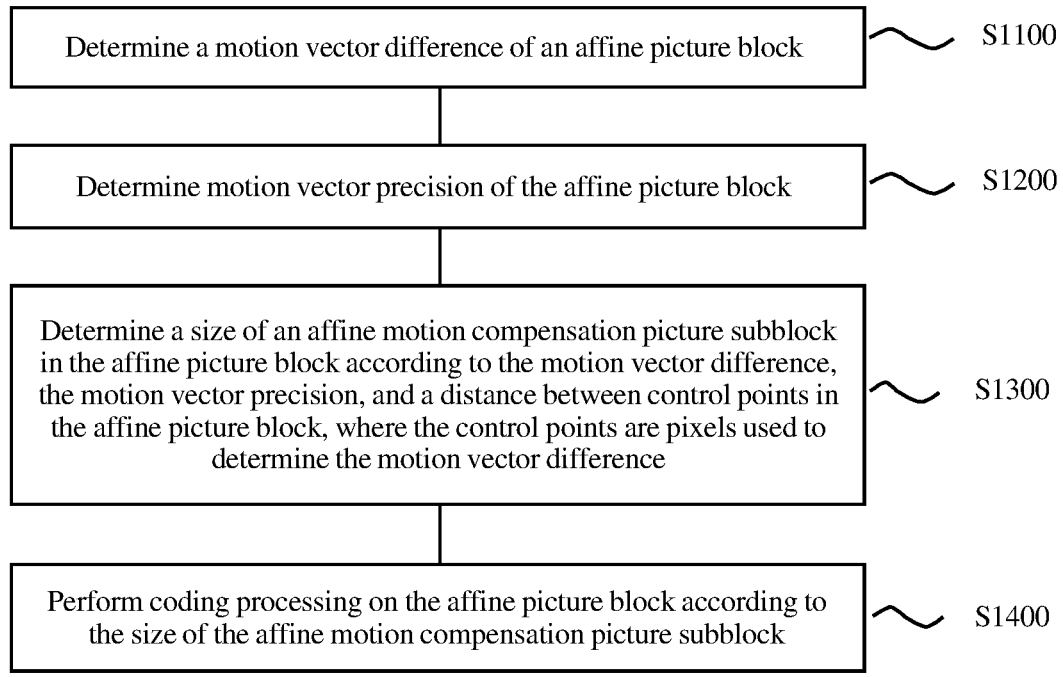
FIG. 1 is a schematic flowchart of a video picture coding method according to an embodiment of the present invention.

FIG. 1 shows a schematic flowchart of a video picture coding method according to an embodiment of the present invention. The method shown in FIG. 1 may be performed by a coding device, for example, an encoder. Specifically, as shown in FIG. 1, the method 1000 includes the following steps.

S1100. Determine a motion vector difference of an affine picture block.

S1200. Determine motion vector precision of the affine picture block.

S1300. Determine a size of an affine motion compensation picture subblock in the affine picture block according to the motion vector difference, the motion vector precision, and a distance between control points in the affine picture block, where the control points are pixels used to determine the motion vector difference.

S1400. Perform coding processing on the affine picture block according to the size of the affine motion compensation picture subblock.

Specifically, the coding device determines the motion vector difference of the affine picture block according to the determined control points, determines the motion vector precision of the affine picture block, determines the size of the affine motion compensation picture subblock in the affine picture block according to the determined motion vector difference, the determined motion vector precision, and the distance between the control points, and performs coding processing on the affine picture block according to the determined size.

Therefore, in the video picture coding method according to this embodiment of the present invention, the coding device determines the size of the affine motion compensation picture subblock according to the determined motion vector difference of the affine picture block, the determined motion vector precision, and the distance between the control points, and performs coding processing on the affine picture block according to the size of the affine motion compensation picture subblock. In this way, a picture subblock of an appropriate size is selected in a coding process, so that coding complexity can be reduced, and coding efficiency can be improved.

It should be understood that, in this embodiment of the present invention, the affine picture block is a picture block in which motion vectors of all units comply with same affine models, for example, a same affine model which may be indicated by same parameters, for example, a same group of parameters. The unit is a group of pixels, for example, may be a pixel, or may be a block structure such as 1×3 or 2×4. This is not limited in the present invention.

It should be understood that, in this embodiment of the present invention, the affine motion compensation ("Affine-MC" for short) picture subblock is a picture subblock that is obtained by dividing the affine picture block and used for performing motion compensation prediction, and affine-MC picture subblocks may have a same size or different sizes. This is not limited in the present invention.

It should also be understood that, in this embodiment of the present invention, any non-overlapping pixels may be selected as control points to determine the motion vector difference of the affine picture block. This is not limited in the present invention.

Figure 2:
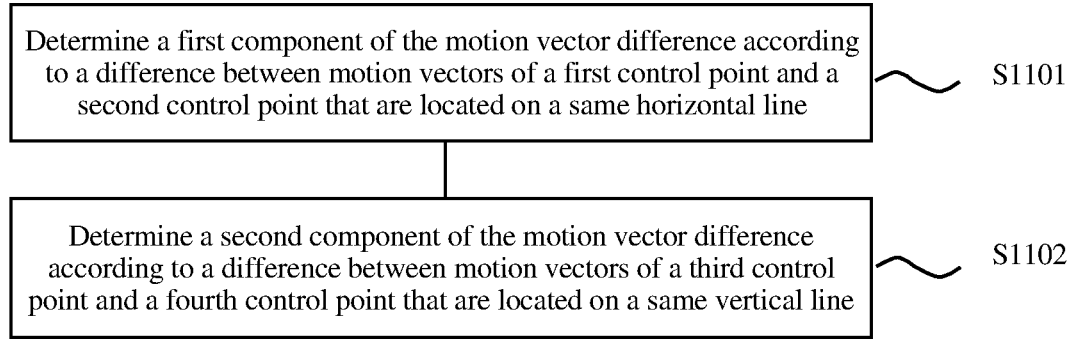
FIG. 2 is another schematic flowchart of a video picture coding method according to an embodiment of the present invention.

Preferably, as shown in FIG. 2, S1100 includes the following steps:

S1101. Determine a first component of the motion vector difference according to a difference between motion vectors of a first control point and a second control point that are located on a same horizontal line.

S1102. Determine a second component of the motion vector difference according to a difference between motion vectors of a third control point and a fourth control point that are located on a same vertical line.

A first horizontal distance exists between the first control point and the second control point, and a first vertical distance exists between the third control point and the fourth control point.

It should be understood that, in this embodiment of the present invention, the first component of the motion vector difference is a horizontal component of the motion vector difference, and the second component of the motion vector difference is a vertical component of the motion vector difference.

It should also be understood that, in this embodiment of the present invention, first, second, third, and fourth are only intended to distinguish between pixels and shall not be construed as any limitation to the protection scope of the present invention. For example, the first control point may also be referred to as the second control point, and the second control point may become the first control point.

In this embodiment of the present invention, optionally, the first control point and the third control point are the same pixel. That is, a quantity of selected control points is three, and one of the three control points is located on a same horizontal line as one of the other two control points, and is located on a same vertical line as the other one of the two control points.

In this embodiment of the present invention, optionally, the first control point, the second control point, the third control point, and the fourth control point are vertices of the affine picture block. Assuming that four vertices of one affine picture block are marked as a vertex in an upper left corner, a vertex in a lower left corner, a vertex in an upper right corner, and a vertex in a lower right corner respectively, any three vertices located in two orthogonal directions may be selected to determine a motion vector difference of the affine picture block. For example, the vertex in the upper left corner, the vertex in the lower left corner, and the vertex in the upper right corner may be selected, or the vertex in the upper left corner, the vertex in the upper right corner, and the vertex in the lower right corner may be selected. This is not limited in the present invention.

In this embodiment of the present invention, optionally, a difference between components in either direction, in components in two directions of the motion vectors of the first control point and the second control point may be determined as the first component of the motion vector difference of the affine picture block, and a difference between components in either direction, in components in two directions of the motion vectors of the third control point and the fourth control point may be determined as the second component of the motion vector difference of the affine picture block; or according to actual requirements for coding complexity and coding efficiency, a numeric value between two differences of components in two directions of the motion vectors of the first control point and the second control point may be determined as the first component, and a numeric value between two differences of components in two directions of the motion vectors of the third control point and the fourth control point may be determined as the second component. This is not limited in the present invention.

Optionally, as shown in FIG. 3, S101 specifically includes the following steps:

S1103. Determine a first horizontal component difference and a first vertical component difference between the motion vectors of the first control point and the second control point.

S1104. Determine a larger one of the first horizontal component difference and the first vertical component difference as the first component of the motion vector difference.

Correspondingly, as shown in FIG. 4, S1102 specifically includes the following steps:

S1105. Determine a second horizontal component difference and a second vertical component difference between the motion vectors of the third control point and the fourth control point.

S1106. Determine a larger one of the second horizontal component difference and the second vertical component difference as the second component of the motion vector difference.

That is, if $vx_{(x,\ y)}$ and $vy_{(x,\ y)}$ are used to indicate a horizontal component and a vertical component of a motion vector of a pixel in a position (x, y), the motion vector difference of the affine picture block may be determined according to formulas (1) and (2):

$$\Delta mv_{hor} = \max(vx_{(x+w,y)} - vx_{(x,y)}, vy_{(x+w,y)} - vy_{x,y}) \quad (1)$$

$$\Delta mv_{ver} = \max(vx_{(x',y'+h)} - vx_{(x',y')}, vy_{(x',y'+h)} - vy_{(x',y')}) \quad (2)$$

where max indicates a maximum value, $\Delta mv_{hor}$ indicates the horizontal component of the motion vector difference of the affine picture block, $\Delta mv_{ver}$ indicates the vertical component of the motion vector difference of the affine picture block, w indicates the first horizontal distance between the first control point and the second control point, and h indicates the first vertical distance between the third control point and the fourth control point.

In this embodiment of the present invention, optionally, an affine transformation parameter of a pixel in the affine picture block may be determined, and pixels in the affine picture block have the same affine transformation parameter.

Correspondingly, S1103 is specifically: determining the first horizontal component difference and the first vertical component difference according to the affine transformation parameter and the first horizontal distance.

S1105 is specifically: determining the second horizontal component difference and the second vertical component difference according to the affine transformation parameter and the first vertical distance.

It should be understood that, sequence numbers of the foregoing processes do not mean execution sequences. The execution sequences of the processes should be determined according to functions and internal logic of the processes, and should not be construed as any limitation to the implementation processes of the embodiments of the present invention.

In this embodiment of the present invention, optionally, an affine transformation model may be a 6-parameter affine transformation model in the prior art, or may be a 4-parameter or 2-parameter affine transformation model. In the 6-parameter affine transformation model, it is assumed that (x, y) are coordinates of a pixel P in a current picture, and (x', y') are coordinates of a pixel P' that is in a reference picture and matches the pixel P, and a,b,c,d,e, and f are affine transformation parameters. If the affine transformation parameters are known, a position (x', y') of the pixel (x, y) in the reference picture may be obtained, and therefore, a prediction signal of the pixel may be obtained from the reference picture:

$$x'=ax+by+e \qquad (3)$$

$$y'=cx+dy+f \qquad (4)$$

Generally, the affine transformation parameters may be obtained through computation according to motion vectors of some pixels in the picture block, and a horizontal component and a vertical component of a motion vector may be indicated by formulas (5) and (6) respectively:

$$vx=x-x' \qquad (5)$$

$$vy=y-y' \qquad (6)$$

The formula (3) is substituted into the formula (5), and the formula (4) is substituted into the formula (6), to obtain a horizontal component and a vertical component of a motion vector of the pixel whose coordinates are (x, y), as shown in formulas (7) and (8) respectively:

$$vx=(1-a)x-by-e \qquad (7)$$

$$vy=(1-d)y-cx-f \qquad (8)$$

The formula (7) is substituted into the formula (1), and the formula (8) is substituted into the formula (2), so that the formulas (1) and (2) are converted into formulas (9) and (10) respectively:

$$\Delta mv_{hor}=\max((1-a)w,-cw) \qquad (9)$$

$$\Delta mv_{ver}=\max(-bh,(1-d)h) \qquad (10)$$

By means of determining the affine transformation parameters a, b, c, and d, and the distance between the control points, the first component and the second component of the motion vector difference of the affine picture block may be determined.

It should be understood that, when the 4-parameter affine transformation model or the 2-parameter affine transformation model is used, the method for determining the motion vector difference is essentially the same as the determining method when the 6-parameter affine transformation model is used. For brevity, details are not described again herein.

In this embodiment of the present invention, optionally, in the coding process, the affine transformation parameter may be obtained by computing each parameter iteratively, for example, adding 1 to the parameter a to determine whether a motion compensation prediction signal in the model is optimal. Alternatively, the affine transformation parameter may be obtained through derivation according to an affine transformation parameter of an adjacent affine picture block. However, the present invention is not limited thereto.

In this embodiment of the present invention, optionally, a motion vector of the first control point, a motion vector of the second control point, a motion vector of the third control point, and a motion vector of the fourth control point may be determined.

Correspondingly, S1103 is specifically: determining a difference between a horizontal component of the motion vector of the first control point and a horizontal component of the motion vector of the second control point as the first horizontal component difference; and determining a difference between a vertical component of the motion vector of the first control point and a vertical component of the motion vector of the second control point as the first vertical component difference.

S1105 is specifically: determining a difference between a horizontal component of the motion vector of the third control point and a horizontal component of the motion vector of the fourth control point as the second horizontal component difference; and determining a difference between a vertical component of the motion vector of the third control point and a vertical component of the motion vector of the fourth control point as the second vertical component difference.

Specifically, the motion vectors of the control points may be directly determined. By means of computing the differences between the components of the motion vectors, the first component and the second component of the motion vector difference of the affine picture block may be directly obtained.

For example, FIG. 5 is a schematic diagram of an affine picture block and control points according to an embodiment of the present invention. Two control points A and B are on a same horizontal line, and have a distance w. Two control points C and D are on a same vertical line, and have a distance h. If motion vectors of the control points A, B, C, and D are known, the first component and the second component of the motion vector difference of the affine picture block may be determined according to formulas (11) and (12):

$$\Delta mv_{hor}=\max(vx_B-vx_A,vy_B-vy_A) \qquad (11)$$

$$\Delta mv_{ver}=\max(vx_C-vx_D,vy_C-vy_D) \qquad (12)$$

In this embodiment of the present invention, optionally, the control points A and C may be the same pixel.

In this embodiment of the present invention, optionally, the control points A, B, C, and D may be vertices of the affine picture block. In this case, a distance between the control points A and B is a width W of the affine picture block, and a distance between the control points C and D is a height H of the affine picture block.

In this embodiment of the present invention, optionally, the first control point and the second control point are two adjacent pixels, and the third control point and the fourth control point are two adjacent pixels.

S1103 and S1105 are specifically: determining a motion vector of a first pixel, a motion vector of a second pixel, and a motion vector of a third pixel, where the first pixel, the second pixel, and the third pixel are non-overlapping pixels; determining a second horizontal distance and a second vertical distance between the first pixel and the second pixel; determining a third horizontal distance and a third vertical distance between the first pixel and the third pixel; and determining the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

Figure 6:
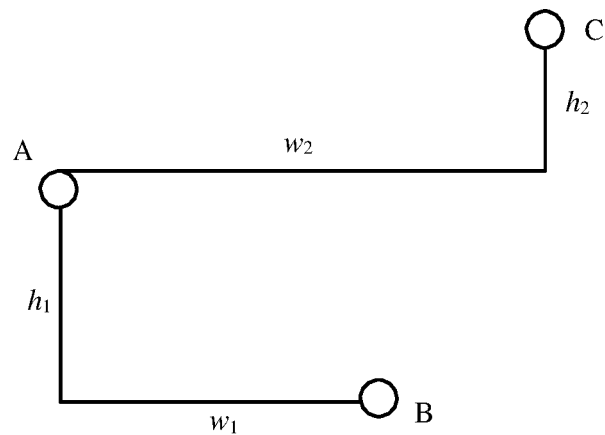
FIG. 6 is a schematic diagram of three non-overlapping pixels in an affine picture block according to an embodiment of the present invention.

Specifically, assuming that A, B, and C are any three non-overlapping pixels in the picture block, positions of the three pixels are shown in FIG. 6, and motion vectors of the three pixels are $(vx_A, vy_A)$, $(vx_B, vy_B)$, and $(vx_C, vy_C)$ respectively. A distance between the pixel A and the pixel B in a horizontal direction is $w_1$, and a distance in a vertical direction is $h_1$. A distance between the pixel A and the pixel C in the horizontal direction is $w_2$, and a distance in the vertical direction is $h_2$. A distance between the pixel B and the pixel C in the horizontal direction is $w_2-w_1$, and a distance in the vertical direction is $h_1+h_2$. It is assumed that horizontal component differences of motion vectors of two adjacent pixels in the horizontal direction are $\Delta mvx_{hor}$ and $\Delta mvy_{hor}$ respectively, and vertical component differences of motion vectors of two adjacent pixels in the vertical direction are $\Delta mvx_{ver}$ and $\Delta mvy_{ver}$ respectively. Because motion vectors in the picture block change linearly, $\Delta mvx_{hor}$, $\Delta mvy_{hor}$, $\Delta mvx_{ver}$, and $\Delta mvy_{ver}$ may be determined by determining motion vectors of the pixels A, B, and C. In this way, motion vector differences of adjacent pixels in the picture block may be determined, and specifically, may be determined according to formulas (13) to (16):

$$vx_B = vx_A + w_1 \cdot \Delta mvx_{hor} + h_1 \cdot \Delta mvx_{ver} \quad (13)$$

$$vy_B = vy_A + w_1 \cdot \Delta mvy_{hor} + h_1 \cdot \Delta mvy_{ver} \quad (14)$$

$$vx_C = vy_A + w_2 \cdot \Delta mvx_{hor} + h_2 \cdot \Delta mvx_{ver} \quad (15)$$

$$vy_C = vy_A + w_2 \cdot \Delta mvy_{hor} + h_2 \cdot \Delta mvy_{ver} \quad (16)$$

or may be determined according to formulas (13) and (14) and formulas (17) and (18):

$$vx_C = vx_B + (w_2-w_1) \cdot \Delta mvx_{hor} + (h_2+h_1) \cdot \Delta mvx_{ver} \quad (17)$$

$$vy_C = vy_B + (w_2-w_1) \cdot \Delta mvy_{hor} + (h_2+h_1) \cdot \Delta mvy_{ver} \quad (18)$$

In this embodiment of the present invention, optionally, the coding device may obtain motion vectors of all control points by performing a motion estimation search; may obtain motion vectors of all control points from adjacent picture blocks; may compute motion vectors of all control points according to the affine transformation model; may obtain motion vectors of some control points by performing a motion estimation search, and obtain motion vectors of other control points from adjacent picture blocks; may obtain motion vectors of some control points by performing an affine motion estimation search, and obtain motion vectors of other control points through computation according to the affine transformation model; or may obtain motion vectors of some control points from adjacent picture blocks, and compute motion vectors of other control points according to the affine transformation model. However, the present invention is not limited thereto.

Optionally, in S1200, a third preset value may be determined as the motion vector precision of the affine picture block; or the motion vector precision of the affine picture block may be determined according to a feature of a picture block adjacent to the affine picture block, where the adjacent picture block is a picture block spatially and/or temporally adjacent to the affine picture block.

Figure 7:
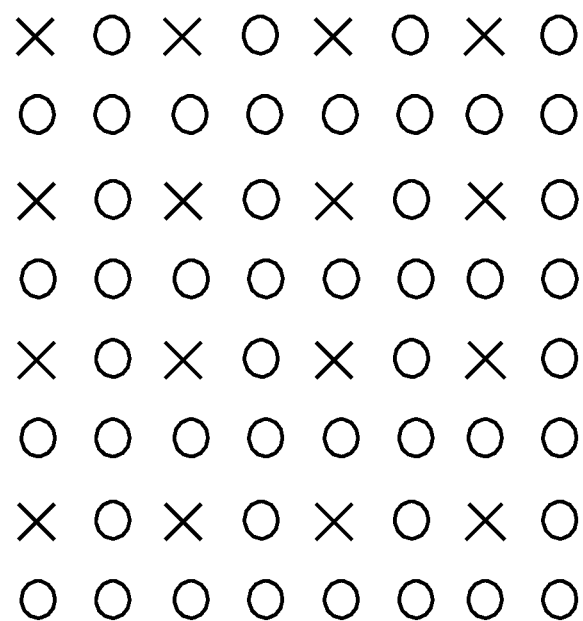
FIG. 7 is another schematic diagram of an affine picture block according to an embodiment of the present invention.

Specifically, a value of a motion vector of the affine picture block may be an integer. In this case, the motion vector is of integer-pixel precision, that is, the pixel precision is 1. Alternatively, a value of a motion vector may not be an integer. In this case, the motion vector is of sub-pixel precision, including precision such as ½, ¼, or ⅛. FIG. 7 shows a 4×4 picture block, where × indicates a pixel in an integer-pixel position, and a captured picture has only pixels in integer-pixel positions. O indicates a pixel in a ½ precision position, and needs to be obtained by interpolating a pixel in an integer-pixel position. Values of pixels in other precision positions need to be obtained by further interpolating pixels in integer-pixel precision positions or pixels in ½ precision positions. If a motion vector of a current pixel is an integer, the motion vector points to a position of × in the reference picture. If the motion vector of the current pixel is of ½ precision, the motion vector points to a position of O in the reference picture.

The motion vector precision of the affine picture block is highest precision of motion vectors of all pixels in the affine picture block. The motion vector precision of the affine picture block may be preset, for example, integer-pixel precision, or precision such as ½, ¼, ⅛, or ¹⁄₁₆. Alternatively, the motion vector precision may be determined according to a feature of a picture block adjacent to the affine picture block. For example, if an adjacent picture is relatively smooth, it may be predicted that the current affine picture block is also relatively smooth. Therefore, higher motion vector precision such as ⅛ or ¹⁄₁₆ precision may be selected. Otherwise, lower motion vector precision such as integer-pixel precision or ½ precision may be selected. The obtained precision is indicated by MvAc.

S1301. Determine a ratio of a product of the motion vector precision and the first horizontal distance to the first component of the motion vector difference as a length of the affine motion compensation picture subblock in a horizontal direction.

S1302. Determine a ratio of a product of the motion vector precision and the first vertical distance to the second component of the motion vector difference as a length of the affine motion compensation picture subblock in a vertical direction.

Optionally, as shown in FIG. 8, S1300 specifically includes the following steps:

Specifically, generally obtained motion vector differences $\Delta mv_{hor}$ and $\Delta mv_{ver}$ are relatively small, indicating that precision of a motion vector of each pixel is excessively high, for example, ¹⁄₃₂ or ¹⁄₆₄. Excessively high motion vector precision contributes little to compression efficiency of a video, and causes a huge amount of computation. Therefore, the affine picture block is divided into multiple affine-MC picture subblocks according to previously obtained expected motion vector precision MvAc to ensure that motion vector precision of each affine-MC picture subblock reaches MvAc.

In this embodiment of the present invention, optionally, assuming that the horizontal distance between the first control point and the second control point is w, and that the vertical distance between the third control point and the fourth control point is h, and assuming that a width of the affine-MC picture subblock is aMcW and that a height of the affine-MC picture subblock is aMcH, aMcW and aMcH may be determined according to formulas (19):

$$\frac{\Delta mv_{hor}}{w} = \frac{MvAc}{aMcW} \text{ and } \frac{\Delta mv_{ver}}{h} = \frac{MvAc}{aMcH} \quad (19)$$

This is equivalent to:

$$aMcW = \frac{MvAc}{\Delta mv_{hor}} \times w \text{ and } aMcH = \frac{MvAc}{\Delta mv_{ver}} \times h.$$

In this embodiment of the present invention, optionally, when the first control point, the second control point, the third control point, and the fourth control point are vertices of the affine picture block, the horizontal distance between the first control point and the second control point is the width W of the affine picture block, and the vertical distance between the third control point and the fourth control point is the height H of the affine picture block. In this case, the width aMcW and the height aMcH of the affine-MC picture subblock may be determined according to formulas (20):

$$\frac{\Delta mv_{hor}}{W} = \frac{MvAc}{aMcW} \text{ and } \frac{\Delta mv_{ver}}{H} = \frac{MvAc}{aMcH} \quad (20)$$

This is equivalent to:

$$aMcW = \frac{MvAc}{\Delta mv_{hor}} \times W \text{ and } aMcH = \frac{MvAc}{\Delta mv_{ver}} \times H.$$

In this embodiment of the present invention, optionally, when the first control point and the second control point are adjacent control points, and the third control point and the fourth control point are adjacent control points, the first horizontal distance between the first control point and the second control point is 1, that is, the first control point is separated from the second control point by an integer quantity of pixels; the first vertical distance between the third control point and the fourth control point is 1, that is, the third control point is separated from the fourth control point by an integer quantity of pixels. In this case, the formulas (19) may be simplified to formulas (21):

$$\Delta mv_{hor} = \frac{MvAc}{aMcW} \text{ and } \Delta mv_{ver} = \frac{MvAc}{aMcH} \quad (21)$$

This is equivalent to:

$$aMcW = \frac{MvAc}{\Delta mv_{hor}} \text{ and } aMcH = \frac{MvAc}{\Delta mv_{ver}}.$$

Therefore, in the video picture coding method according to this embodiment of the present invention, the coding device determines the size of the affine motion compensation picture subblock according to the determined motion vector difference of the affine picture block, the determined motion vector precision, and the distance between the control points, and performs coding processing on the affine picture block according to the size of the affine motion compensation picture subblock. In this way, a picture subblock of an appropriate size is selected in the coding process, so that coding complexity can be reduced and coding efficiency can be improved, while motion compensation prediction efficiency in affine transformation is maintained.

Optionally, as shown in FIG. 9, S1300 includes the following steps.

S1303. When a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than the first preset value, determine the first preset value as a length of the affine motion compensation picture subblock in a horizontal direction.

S1304. When a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than the second preset value, determine the second preset value as a length of the affine motion compensation picture subblock in a vertical direction.

Specifically, for a hardware implementation in the coding process, a lower limit may be set for the width and the height of the affine-MC picture subblock. When the computed width or height is less than the preset lower limit, the preset lower limit is determined as the width or the height of the affine-MC picture subblock. Preferably, the lower limit may be set to 4, but may also be set to another numeric value according to an actual requirement. For example, a lower limit of the width may be set to 2, and a lower value of the height is set to 3; or a lower limit of the width is set to 1, and a lower value of the height is set to 2. This is not limited in the present invention.

Optionally, as shown in FIG. 10, S1400 includes the following steps:

S1401. Determine a motion vector of each affine motion compensation picture subblock in the affine motion compensation picture subblocks.

S1402. Determine a motion compensation prediction signal of each affine motion compensation picture subblock according to the motion vector of each affine motion compensation picture subblock.

S1403. Determine a prediction residual signal of each affine motion compensation picture subblock according to the motion compensation prediction signal of each affine motion compensation picture subblock.

S1404. Code the prediction residual signal of each affine motion compensation picture subblock.

It should be understood that, in this embodiment of the present invention, each affine-MC picture subblock may include multiple pixels, and a motion vector of a pixel needs to be selected from each affine-MC picture subblock as a motion vector of the affine-MC picture subblock.

Optionally, in S1401, a motion vector of a pixel in a central position of the affine-MC picture subblock may be selected as the motion vector of the affine-MC picture subblock; an average value of motion vectors of all pixels in the affine-MC picture subblock may be used as the motion vector of the affine-MC picture subblock; or a motion vector of a pixel in an upper left corner of the affine-MC picture subblock may be selected as the motion vector of the affine-MC picture subblock. However, the present invention is not limited thereto.

In this embodiment of the present invention, optionally, signals of boundary pixels of each affine motion compensation picture subblock are filtered, and the boundary pixels are pixels in one or more rows at a boundary of each affine motion compensation picture subblock.

In this embodiment of the present invention, optionally, the signal of the boundary pixel includes a motion compensation prediction signal and/or a reconstructed signal, and the reconstructed signal is a sum of the motion compensation prediction signal and a reconstructed residual signal.

Specifically, as shown in FIG. 11, a thick solid line block indicates an affine picture block, a thin solid line block indicates an affine-MC picture subblock, a dashed line block indicates pixels at boundaries of adjacent affine-MC picture subblocks, and a cross indicates a pixel. A region of a dashed line block in FIG. 11 includes pixels of adjacent affine-MC picture subblocks in two rows or two columns at boundaries of the affine-MC picture subblocks, or may include one row or one column, or three rows or three columns at the boundaries of the affine-MC picture subblocks. Because motion vectors of adjacent affine-MC picture subblocks may be different, prediction signals obtained from the reference picture are not adjacent in the reference picture. This causes discontinuity of prediction signals at the boundaries of the adjacent affine-MC picture subblocks, and therefore causes discontinuity of residuals, and affects coding efficiency of the residuals. Therefore, filtering the motion compensation prediction signals at the boundaries of the affine-MC picture subblocks is considered.

A reconstructed signal is generally obtained by adding a reconstructed residual signal to a motion compensation prediction signal. Generally, lossy coding is used for the residual signal. This causes distortion between the reconstructed residual signal and an original residual signal. Distortion directions of pixels at the boundaries of adjacent affine-MC picture subblocks may be inconsistent. For example, a right pixel of a first affine-MC picture subblock becomes larger due to distortion, and a left pixel of a right adjacent affine-MC picture subblock becomes smaller due to distortion. This causes discontinuity of pixel values at boundaries of reconstructed pixels of the affine-MC picture subblocks, and impairs subjective and objective effects. Therefore, the reconstructed signals need to be filtered.

In this embodiment of the present invention, optionally, filtering may be performing by using a low-pass filter, so that pixel values in the boundary region change more smoothly. For example, filtering is performed by using a Gauss filter. However, the present invention is not limited thereto.

In this embodiment of the present invention, optionally, filtering may be performed by using an overlapped block motion compensation (Overlapped block motion compensation, "OBMC" for short) method. Motion compensation prediction is performed on a to-be-filtered pixel by using a motion vector of an affine-MC picture subblock adjacent to the to-be-filtered pixel, and weighted averaging is performed on the obtained motion compensation prediction signal and a motion compensation prediction signal obtained by using a motion vector of the to-be-filtered pixel, to obtain a final motion compensation prediction signal.

To better prove beneficial effects of this embodiment of the present invention relative to the prior art, an LDP test structure is used to test coding complexity and coding efficiency when the method in this embodiment of the present invention and the method in the prior art are used to perform coding. A result is shown in Table 1.

TABLE 1

| Class | Sequence | The method in the present invention relative to the method in the prior art |
|---|---|---|
| LDP | Tractor | −0.2% |
| | BlueSky | 0.0% |
| | SpinCalendar | 0.0% |
| | Jets | −0.5% |
| | Enct | 86% |
| | Dect | 78% |

As can be seen from Table 1, using the video picture coding method in this embodiment of the present invention can improve coding efficiency and reduce a coding time.

Therefore, in the video picture coding method according to this embodiment of the present invention, the coding device determines the size of the affine motion compensation picture subblock according to the determined motion vector difference of the affine picture block, the determined motion vector precision, and the distance between the control points, and performs coding processing on the affine picture block according to the size of the affine motion compensation picture subblock. In this way, a picture subblock of an appropriate size is selected in the coding process, so that coding complexity can be reduced, and coding efficiency can be improved.

The video picture coding method according to this embodiment of the present invention is hereinbefore described in detail with reference to FIG. 1 to FIG. 11. A video picture decoding method according to an embodiment of the present invention is hereinafter described in detail with reference to FIG. 12 to FIG. 18. It should be noted that, related operations of a decoder are essentially consistent with those of an encoder. To avoid repetition, details are not described again herein.

Figure 12:
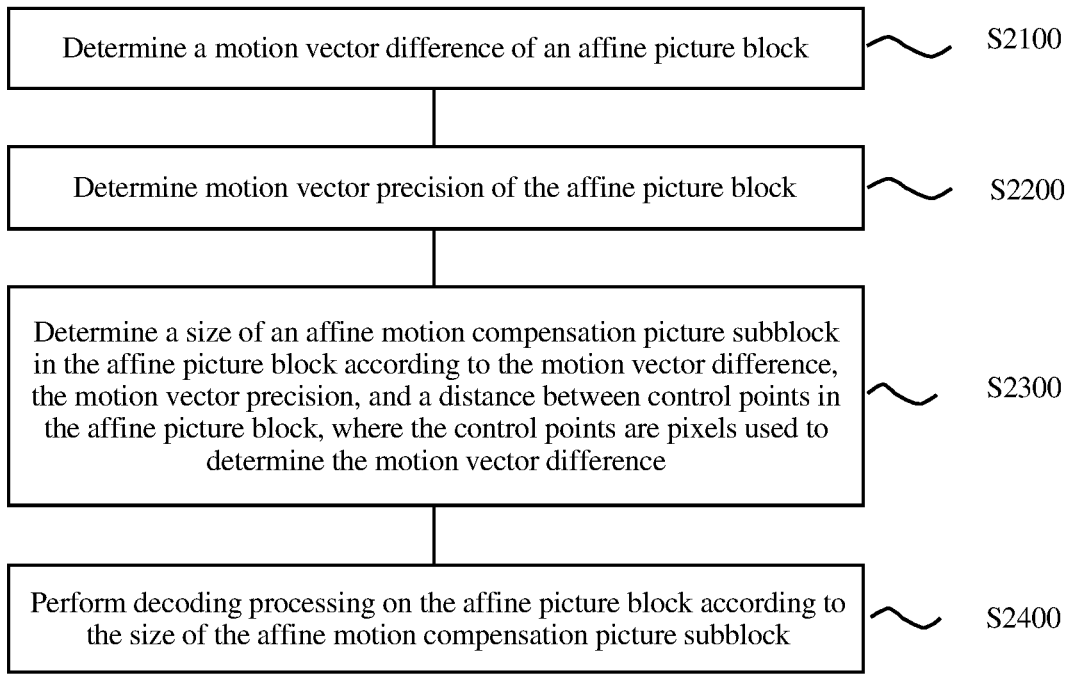
FIG. 12 is a schematic flowchart of a video picture decoding method according to an embodiment of the present invention.

FIG. 12 shows a schematic flowchart of a video picture decoding method according to an embodiment of the present invention. The method shown in FIG. 12 may be performed by a decoding device, for example, a decoder. Specifically, as shown in FIG. 12, the method 2000 includes the following steps.

S2100. Determine a motion vector difference of an affine picture block.

S2200. Determine motion vector precision of the affine picture block.

S2300. Determine a size of an affine motion compensation picture subblock in the affine picture block according to the motion vector difference, the motion vector precision, and a distance between control points in the affine picture block, where the control points are pixels used to determine the motion vector difference.

S2400. Perform decoding processing on the affine picture block according to the size of the affine motion compensation picture subblock.

Specifically, the decoding device determines the motion vector difference of the affine picture block according to the determined control points, determines the motion vector precision of the affine picture block, determines the size of the affine motion compensation picture subblock in the affine picture block according to the determined motion vector difference, the determined motion vector precision, and the distance between the control points, and performs decoding processing on the affine picture block according to the determined size.

Therefore, in the video picture decoding method according to this embodiment of the present invention, the decoding device determines the size of the affine motion compensation picture subblock according to the determined motion vector difference of the affine picture block, the determined motion vector precision, and the distance between the control points, and performs decoding processing on the affine picture block according to the determined size. In this way, a picture subblock of an appropriate size is selected in a decoding process, so that decoding complexity can be reduced, and decoding efficiency can be improved.

Figure 13:
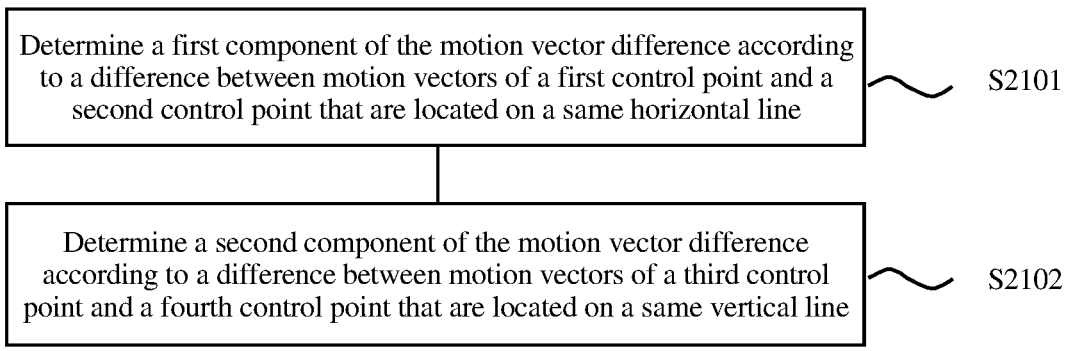
FIG. 13 is another schematic flowchart of a video picture decoding method according to an embodiment of the present invention.

Preferably, as shown in FIG. 13, S2100 includes the following steps:

S2101. Determine a first component of the motion vector difference according to a difference between motion vectors of a first control point and a second control point that are located on a same horizontal line.

S2102. Determine a second component of the motion vector difference according to a difference between motion vectors of a third control point and a fourth control point that are located on a same vertical line.

A first horizontal distance exists between the first control point and the second control point, and a first vertical distance exists between the third control point and the fourth control point.

It should be understood that, in this embodiment of the present invention, the first component of the motion vector difference is a horizontal component of the motion vector difference, and the second component of the motion vector difference is a vertical component of the motion vector difference.

Optionally, as shown in FIG. 14, S2101 specifically includes the following steps:

S2103. Determine a first horizontal component difference and a first vertical component difference between the motion vectors of the first control point and the second control point.

S2104. Determine a larger one of the first horizontal component difference and the first vertical component difference as the first component of the motion vector difference.

Correspondingly, as shown in FIG. 15, S2102 specifically includes the following steps:

S2105. Determine a second horizontal component difference and a second vertical component difference between the motion vectors of the third control point and the fourth control point.

S2106. Determine a larger one of the second horizontal component difference and the second vertical component difference as the second component of the motion vector difference.

In this embodiment of the present invention, optionally, an affine transformation parameter of a pixel in the affine picture block may be determined, and pixels in the affine picture block have the same affine transformation parameter.

Correspondingly, S2103 is specifically: determining the first horizontal component difference and the first vertical component difference according to the affine transformation parameter and the first horizontal distance.

S2105 is specifically: determining the second horizontal component difference and the second vertical component difference according to the affine transformation parameter and the first vertical distance.

In this embodiment of the present invention, optionally, a motion vector of the first control point, a motion vector of the second control point, a motion vector of the third control point, and a motion vector of the fourth control point may be determined.

Correspondingly, S2103 is specifically: determining a difference between a horizontal component of the motion vector of the first control point and a horizontal component of the motion vector of the second control point as the first horizontal component difference; and determining a difference between a vertical component of the motion vector of the first control point and a vertical component of the motion vector of the second control point as the first vertical component difference.

S2105 is specifically: determining a difference between a horizontal component of the motion vector of the third control point and a horizontal component of the motion vector of the fourth control point as the second horizontal component difference; and determining a difference between a vertical component of the motion vector of the third control point and a vertical component of the motion vector of the fourth control point as the second vertical component difference.

In this embodiment of the present invention, optionally, the first control point and the second control point are two adjacent pixels, and the third control point and the fourth control point are two adjacent pixels.

S2103 and S2105 are specifically: determining a motion vector of a first pixel, a motion vector of a second pixel, and a motion vector of a third pixel, where the first pixel, the second pixel, and the third pixel are non-overlapping pixels; determining a second horizontal distance and a second vertical distance between the first pixel and the second pixel; determining a third horizontal distance and a third vertical distance between the first pixel and the third pixel; and determining the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

In this embodiment of the present invention, optionally, the decoding device may obtain motion vectors of all control points by parsing a bit stream; may obtain motion vectors of all control points from adjacent picture blocks; may compute motion vectors of all control points according to an affine transformation model; may obtain motion vectors of some control points by parsing a bit stream, and obtain motion vectors of other control points from adjacent picture blocks; may obtain motion vectors of some control points by parsing a bit stream, and obtain motion vectors of other control points through computation according to an affine transformation model; or may obtain motion vectors of some control points from adjacent picture blocks, and compute motion vectors of other control points according to an affine transformation model. However, the present invention is not limited thereto.

Optionally, in S2200, a third preset value may be determined as the motion vector precision of the affine picture block; or the motion vector precision of the affine picture block is determined according to a feature of a picture block adjacent to the affine picture block, where the adjacent picture block is a picture block spatially and/or temporally adjacent to the affine picture block.

S2301. Determine a ratio of a product of the motion vector precision and the first horizontal distance to the first component of the motion vector difference as a length of the affine motion compensation picture subblock in a horizontal direction.

Optionally, as shown in FIG. 16, S2300 specifically includes the following steps:

S2302. Determine a ratio of a product of the motion vector precision and the first vertical distance to the second component of the motion vector difference as a length of the affine motion compensation picture subblock in a vertical direction.

Optionally, as shown in FIG. 17, S2300 includes the following steps:

S2303. When a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the horizontal component of the motion vector difference is less than the first preset value, determine the first preset value as a length of the affine motion compensation picture subblock in a horizontal direction.

S2304. When a ratio of a product of the motion vector precision and the first vertical distance to the vertical component of the motion vector difference is greater than or equal to a second preset value, determine the ratio as a length of the affine motion compensation picture subblock in a vertical direction; or when a ratio of a product of the motion vector precision and the first vertical distance to the vertical component of the motion vector difference is less than the second preset value, determine the second preset value as a length of the affine motion compensation picture subblock in a vertical direction.

Figure 18:
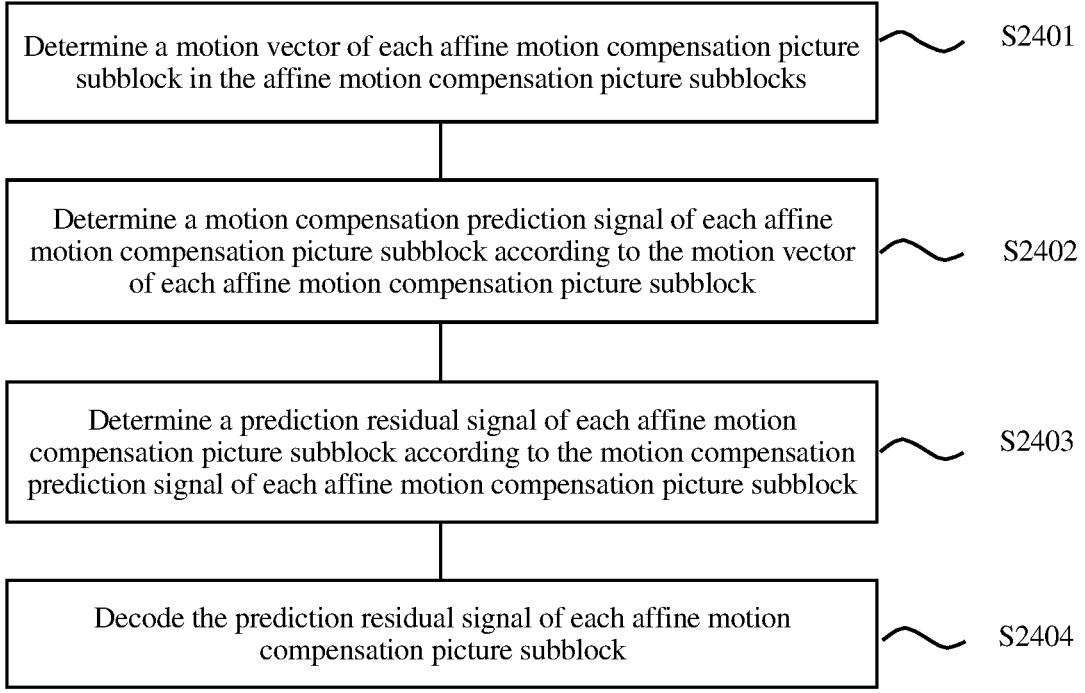
FIG. 18 is still another schematic flowchart of a video picture decoding method according to an embodiment of the present invention.

Optionally, as shown in FIG. 18, S2400 includes the following steps:

S2401. Determine a motion vector of each affine motion compensation picture subblock in the affine motion compensation picture subblocks.

S2402. Determine a motion compensation prediction signal of each affine motion compensation picture subblock according to the motion vector of each affine motion compensation picture subblock.

S2403. Determine a prediction residual signal of each affine motion compensation picture subblock according to the motion compensation prediction signal of each affine motion compensation picture subblock.

S2404. Decode the prediction residual signal of each affine motion compensation picture subblock.

In this embodiment of the present invention, optionally, signals of boundary pixels of each affine motion compensation picture subblock are filtered, and the boundary pixels are pixels in one or more rows at a boundary of each affine motion compensation picture subblock.

In this embodiment of the present invention, optionally, the signal of the boundary pixel includes a motion compensation prediction signal and/or a reconstructed signal, and the reconstructed signal is a sum of the motion compensation prediction signal and a reconstructed residual signal. Therefore, in the video picture decoding method according to this embodiment of the present invention, the decoding device determines the size of the affine motion compensation picture subblock according to the determined motion vector difference of the affine picture block, the motion vector precision, and the distance between the control points, and performs decoding processing on the affine picture block according to the determined size. In this way, a picture subblock of an appropriate size is selected in the decoding process, so that decoding complexity can be reduced, and decoding efficiency can be improved.

Optionally, the decoding method in the present invention may also be: parsing a bit stream to obtain a motion vector difference of an affine picture block and motion vector precision of the affine picture block, where pixels in the affine picture block have a same affine transformation parameter; determining a size of an affine motion compensation picture subblock in the affine picture block according to the motion vector difference, the motion vector precision, and a distance between control points in the affine picture block, where the control points are pixels used to determine the motion vector difference; and performing decoding processing on the affine picture block according to the size of the affine motion compensation picture subblock.

Alternatively, the decoding method may be: parsing a bit stream to obtain affine picture block information; determining a size of an affine motion compensation picture subblock in the affine picture block according to the affine picture block information; and performing decoding processing on the affine picture block according to the size of the affine motion compensation picture subblock.

In such a manner, the decoder may directly use a parameter sent by an encoder to the decoder to determine the size of the affine motion compensation picture subblock without re-computation, and further reduce computational complexity.

Figure 19:
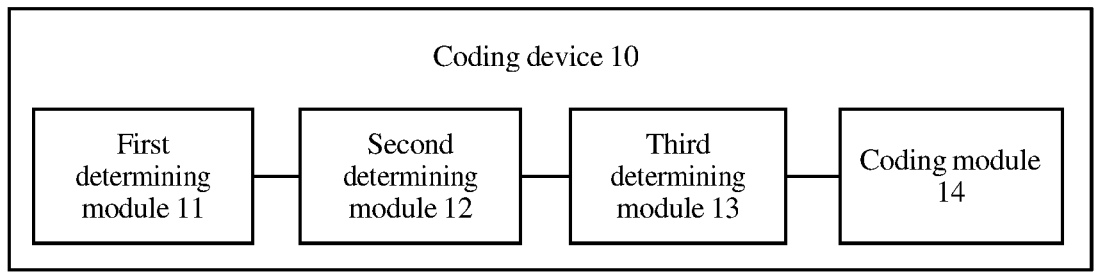
FIG. 19 is a schematic block diagram of a coding device according to an embodiment of the present invention.
Figure 20:
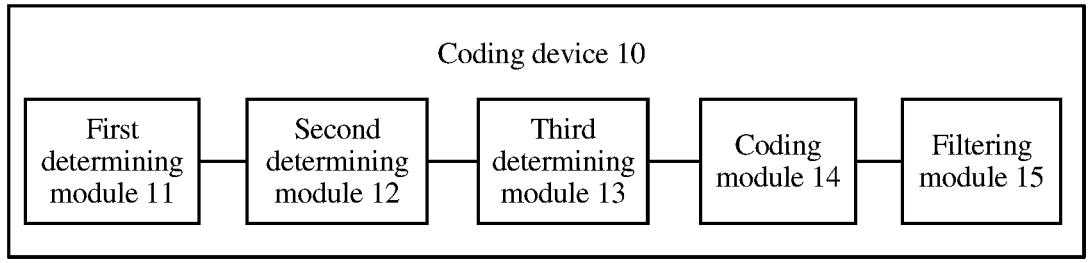
FIG. 20 is another schematic block diagram of a coding device according to an embodiment of the present invention.

The following describes in detail a coding device according to an embodiment of the present invention with reference to FIG. 19 and FIG. 20. As shown in FIG. 19, the coding device 10 includes: a first determining module 11, configured to determine a motion vector difference of an affine picture block; a second determining module 12, configured to determine motion vector precision of the affine picture block; a third determining module 13, configured to determine a size of an affine motion compensation picture subblock in the affine picture block according to the motion vector difference determined by the first determining module 11, the motion vector precision determined by the second determining module 12, and a distance between control points in the affine picture block, where the control points are pixels used to determine the motion vector difference; and a coding module 14, configured to perform coding processing on the affine picture block according to the size of the affine motion compensation picture subblock that is determined by the third determining module 13.

Specifically, the coding device determines the motion vector difference of the affine picture block according to the determined control points, determines the motion vector precision of the affine picture block, determines the size of the affine motion compensation picture subblock in the affine picture block according to the determined motion vector difference, the determined motion vector precision, and the distance between the control points, and performs coding processing on the affine picture block according to the determined size.

Therefore, the coding device according to this embodiment of the present invention determines the size of the affine motion compensation picture subblock according to the determined motion vector difference of the affine picture block, the determined motion vector precision, and the distance between the control points, and performs coding processing on the affine picture block according to the size of the affine motion compensation picture subblock. In this way, a picture subblock of an appropriate size is selected in a coding process, so that coding complexity can be reduced, and coding efficiency can be improved.

In this embodiment of the present invention, optionally, the first determining module 11 is specifically configured to: determine a first component of the motion vector difference according to a difference between motion vectors of a first control point and a second control point that are located on a same horizontal line; and determine a second component of the motion vector difference according to a difference between motion vectors of a third control point and a fourth control point that are located on a same vertical line; where a first horizontal distance exists between the first control point and the second control point, and a first vertical distance exists between the third control point and the fourth control point.

In this embodiment of the present invention, optionally, the first determining module 11 is specifically configured to: determine a first horizontal component difference and a first vertical component difference between the motion vectors of the first control point and the second control point; determine a larger one of the first horizontal component difference and the first vertical component difference as the first component of the motion vector difference; determine a second horizontal component difference and a second vertical component difference between the motion vectors of the third control point and the fourth control point; and determine a larger one of the second horizontal component difference and the second vertical component difference as the second component of the motion vector difference.

In this embodiment of the present invention, optionally, the first determining module 11 is specifically configured to: determine an affine transformation parameter of a pixel in the affine picture block, where pixels in the affine picture block have the same affine transformation parameter; determine the first horizontal component difference and the first vertical component difference according to the affine transformation parameter and the first horizontal distance; and determine the second horizontal component difference and the second vertical component difference according to the affine transformation parameter and the first vertical distance.

In this embodiment of the present invention, optionally, the first determining module 11 is specifically configured to: determine a motion vector of the first control point, a motion vector of the second control point, a motion vector of the third control point, and a motion vector of the fourth control point; determine a difference between a horizontal component of the motion vector of the first control point and a horizontal component of the motion vector of the second control point as the first horizontal component difference; determine a difference between a vertical component of the motion vector of the first control point and a vertical component of the motion vector of the second control point as the first vertical component difference; determine a difference between a horizontal component of the motion vector of the third control point and a horizontal component of the motion vector of the fourth control point as the second horizontal component difference; and determine a difference between a vertical component of the motion vector of the third control point and a vertical component of the motion vector of the fourth control point as the second vertical component difference.

In this embodiment of the present invention, optionally, the first control point and the second control point are two adjacent pixels, and the third control point and the fourth control point are two adjacent pixels.

The first determining module 11 is specifically configured to: determine a motion vector of a first pixel, a motion vector of a second pixel, and a motion vector of a third pixel, where the first pixel, the second pixel, and the third pixel are non-overlapping pixels; determine a second horizontal distance and a second vertical distance between the first pixel and the second pixel; determine a third horizontal distance and a third vertical distance between the first pixel and the third pixel; and determine the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

In this embodiment of the present invention, optionally, the third determining module 13 is specifically configured to: determine a ratio of a product of the motion vector precision and the first horizontal distance to the first component of the motion vector difference as a length of the affine motion compensation picture subblock in a horizontal direction; and determine a ratio of a product of the motion vector precision and the first vertical distance to the second component of the motion vector difference as a length of the affine motion compensation picture subblock in a vertical direction.

In this embodiment of the present invention, optionally, the third determining module 13 is specifically configured to: when a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than the first preset value, determine the first preset value as a length of the affine motion compensation picture subblock in a horizontal direction; and when a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than the second preset value, determine the second preset value as a length of the affine motion compensation picture subblock in a vertical direction.

In this embodiment of the present invention, optionally, the first control point and the third control point are the same pixel.

In this embodiment of the present invention, optionally, the first control point, the second control point, the third control point, and the fourth control point are vertices of the affine picture block.

In this embodiment of the present invention, optionally, the first preset value is 4, and/or the second preset value is 4.

In this embodiment of the present invention, optionally, the second determining module 12 is specifically configured to: determine a third preset value as the motion vector precision of the affine picture block; or determine the motion vector precision of the affine picture block according to a feature of a picture block adjacent to the affine picture block, where the adjacent picture block is a picture block spatially and/or temporally adjacent to the affine picture block.

In this embodiment of the present invention, optionally, the coding module 14 is specifically configured to: determine a motion vector of each affine motion compensation picture subblock in the affine motion compensation picture subblocks; determine a motion compensation prediction signal of each affine motion compensation picture subblock according to the motion vector of each affine motion compensation picture subblock; determine a prediction residual signal of each affine motion compensation picture subblock according to the motion compensation prediction signal of each affine motion compensation picture subblock; and code the prediction residual signal of each affine motion compensation picture subblock.

In this embodiment of the present invention, optionally, as shown in FIG. 20, the coding device 10 further includes: a filtering module 15, configured to filter signals of boundary pixels of each affine motion compensation picture subblock, where the boundary pixels are pixels in one or more rows at a boundary of each affine motion compensation picture subblock.

In this embodiment of the present invention, optionally, the signal of the boundary pixel includes a motion compensation prediction signal and/or a reconstructed signal, and the reconstructed signal is a sum of the motion compensation prediction signal and a reconstructed residual signal.

It should be understood that, the coding device 10 according to this embodiment of the present invention may correspondingly perform the video picture coding method 1000 in the embodiments of the present invention, and the foregoing and other operations and/or functions of the modules in the coding device 10 are separately intended to implement the corresponding procedures of the method in FIG. 1 to FIG. 11. For brevity, details are not described again herein.

Therefore, the coding device according to this embodiment of the present invention determines the size of the affine motion compensation picture subblock according to the determined motion vector difference of the affine picture block, the determined motion vector precision, and the distance between the control points, and performs coding processing on the affine picture block according to the size. In this way, a picture subblock of an appropriate size is selected in the coding process, so that coding complexity can be reduced, and coding efficiency can be improved.

Figure 21:
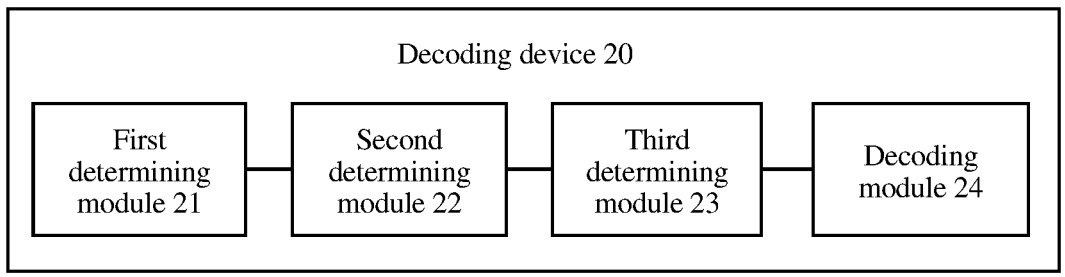
FIG. 21 is a schematic block diagram of a decoding device according to an embodiment of the present invention.
Figure 22:
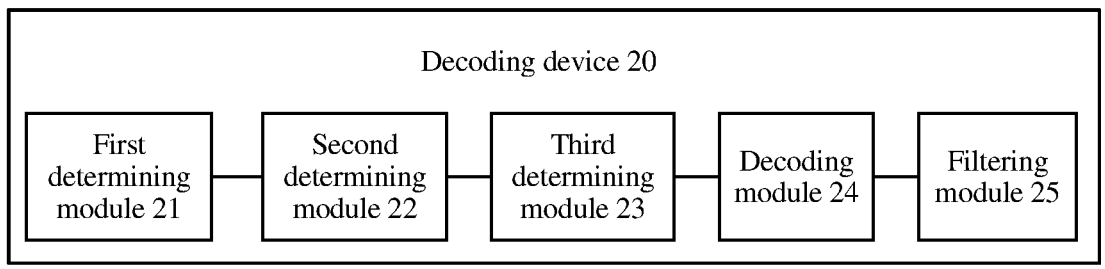
FIG. 22 is another schematic block diagram of a decoding device according to an embodiment of the present invention.

The following describes in detail a decoding device according to an embodiment of the present invention with reference to FIG. 21 and FIG. 22. As shown in FIG. 21, the decoding device 20 includes: a first determining module 21, configured to determine a motion vector difference of an affine picture block; a second determining module 22, configured to determine motion vector precision of the affine picture block; a third determining module 23, configured to determine a size of an affine motion compensation picture subblock in the affine picture block according to the motion vector difference determined by the first determining module 21, the motion vector precision determined by the second determining module 22, and a distance between control points in the affine picture block, where the control points are pixels used to determine the motion vector difference; and a decoding module 24, configured to perform decoding processing on the affine picture block according to the size of the affine motion compensation picture subblock that is determined by the third determining module 23.

Specifically, the decoding device determines the motion vector difference of the affine picture block according to the determined control points, determines the motion vector precision of the affine picture block, determines the size of the affine motion compensation picture subblock in the affine picture block according to the determined motion vector difference, the determined motion vector precision, and the distance between the control points, and performs decoding processing on the affine picture block according to the determined size.

Therefore, the decoding device according to this embodiment of the present invention determines the size of the affine motion compensation picture subblock according to the determined motion vector difference of the affine picture block, the determined motion vector precision, and the distance between the control points, and performs decoding processing on the affine picture block according to the size of the affine motion compensation picture subblock. In this way, a picture subblock of an appropriate size is selected in a decoding process, so that decoding complexity can be reduced, and decoding efficiency can be improved.

In this embodiment of the present invention, optionally, the first determining module 21 is specifically configured to: determine a first component of the motion vector difference according to a difference between motion vectors of a first control point and a second control point that are located on a same horizontal line; and determine a second component of the motion vector difference according to a difference between motion vectors of a third control point and a fourth control point that are located on a same vertical line; where a first horizontal distance exists between the first control point and the second control point, and a first vertical distance exists between the third control point and the fourth control point.

In this embodiment of the present invention, optionally, the first determining module 21 is specifically configured to: determine a first horizontal component difference and a first vertical component difference between the motion vectors of the first control point and the second control point; determine a larger one of the first horizontal component difference and the first vertical component difference as the first component of the motion vector difference; determine a second horizontal component difference and a second vertical component difference between the motion vectors of the third control point and the fourth control point; and determine a larger one of the second horizontal component difference and the second vertical component difference as the second component of the motion vector difference.

In this embodiment of the present invention, optionally, the first determining module 21 is specifically configured to: determine an affine transformation parameter of a pixel in the affine picture block, where pixels in the affine picture block have the same affine transformation parameter; determine the first horizontal component difference and the first vertical component difference according to the affine transformation parameter and the first horizontal distance; and determine the second horizontal component difference and the second vertical component difference according to the affine transformation parameter and the first vertical distance.

In this embodiment of the present invention, optionally, the first determining module 21 is specifically configured to: determine a motion vector of the first control point, a motion vector of the second control point, a motion vector of the third control point, and a motion vector of the fourth control point; determine a difference between a horizontal component of the motion vector of the first control point and a horizontal component of the motion vector of the second control point as the first horizontal component difference; determine a difference between a vertical component of the motion vector of the first control point and a vertical component of the motion vector of the second control point as the first vertical component difference; determine a difference between a horizontal component of the motion vector of the third control point and a horizontal component of the motion vector of the fourth control point as the second horizontal component difference; and determine a difference between a vertical component of the motion vector of the third control point and a vertical component of the motion vector of the fourth control point as the second vertical component difference.

In this embodiment of the present invention, optionally, the first control point and the second control point are two adjacent pixels, and the third control point and the fourth control point are two adjacent pixels.

The first determining module 21 is specifically configured to: determine a motion vector of a first pixel, a motion vector of a second pixel, and a motion vector of a third pixel, where the first pixel, the second pixel, and the third pixel are non-overlapping pixels; determine a second horizontal distance and a second vertical distance between the first pixel and the second pixel; determine a third horizontal distance and a third vertical distance between the first pixel and the third pixel; and determine the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

In this embodiment of the present invention, optionally, the third determining module 23 is specifically configured to: determine a ratio of a product of the motion vector precision and the first horizontal distance to the first component of the motion vector difference as a length of the affine motion compensation picture subblock in a horizontal direction; and determine a ratio of a product of the motion vector precision and the first vertical distance to the second component of the motion vector difference as a length of the affine motion compensation picture subblock in a vertical direction.

In this embodiment of the present invention, optionally, the third determining module 23 is specifically configured to: when a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than the first preset value, determine the first preset value as a length of the affine motion compensation picture subblock in a horizontal direction; and when a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than the second preset value, determine the second preset value as a length of the affine motion compensation picture subblock in a vertical direction.

In this embodiment of the present invention, optionally, the first control point and the third control point are the same pixel.

In this embodiment of the present invention, optionally, the first control point, the second control point, the third control point, and the fourth control point are vertices of the affine picture block.

In this embodiment of the present invention, optionally, the first preset value is 4, and/or the second preset value is 4.

In this embodiment of the present invention, optionally, the second determining module 22 is specifically configured to: determine a third preset value as the motion vector precision of the affine picture block; or determine the motion vector precision of the affine picture block according to a feature of a picture block adjacent to the affine picture block, where the adjacent picture block is a picture block spatially and/or temporally adjacent to the affine picture block.

In this embodiment of the present invention, optionally, the decoding module 24 is specifically configured to: determine a motion vector of each affine motion compensation picture subblock in the affine motion compensation picture subblocks; determine a motion compensation prediction signal of each affine motion compensation picture subblock according to the motion vector of each affine motion compensation picture subblock; determine a prediction residual signal of each affine motion compensation picture subblock according to the motion compensation prediction signal of each affine motion compensation picture subblock; and decode the prediction residual signal of each affine motion compensation picture subblock.

In this embodiment of the present invention, optionally, as shown in FIG. 22, the decoding device 20 further includes: a filtering module 25, configured to filter signals of boundary pixels of each affine motion compensation picture subblock, where the boundary pixels are pixels in one or more rows at a boundary of each affine motion compensation picture subblock.

In this embodiment of the present invention, optionally, the signal of the boundary pixel includes a motion compensation prediction signal and/or a reconstructed signal, and the reconstructed signal is a sum of the motion compensation prediction signal and a reconstructed residual signal.

It should be understood that, the decoding device 20 according to this embodiment of the present invention may correspondingly perform the video picture decoding method 2000 in the embodiments of the present invention, and the foregoing and other operations and/or functions of the modules in the decoding device 20 are separately intended to implement the corresponding procedures of the method in FIG. 12 to FIG. 18. For brevity, details are not described again herein.

Therefore, the decoding device according to this embodiment of the present invention determines the size of the affine motion compensation picture subblock according to the determined motion vector difference of the affine picture block, the determined motion vector precision, and the distance between the control points, and performs decoding processing on the affine picture block according to the size. In this way, a picture subblock of an appropriate size is selected in the decoding process, so that decoding complexity can be reduced, and decoding efficiency can be improved.

Figure 23:
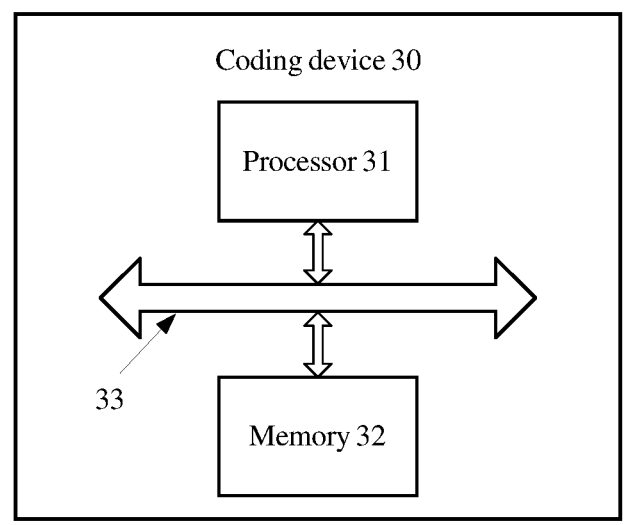
FIG. 23 is a schematic block diagram of a coding device according to another embodiment of the present invention.

As shown in FIG. 23, an embodiment of the present invention further provides a coding device 30, including a processor 31, a memory 32, and a bus system 33. The processor 31 and the memory 32 are connected by the bus system 33. The memory 32 is configured to store an instruction. The processor 31 is configured to execute the instruction stored in the memory 32. The memory 32 of the coding device 30 stores program code, and the processor 31 may invoke the program code stored in the memory 32 to perform the following operations: determining a motion vector difference of an affine picture block; determining motion vector precision of the affine picture block; determining a size of an affine motion compensation picture subblock in the affine picture block according to the motion vector difference, the motion vector precision, and a distance between control points in the affine picture block, where the control points are pixels used to determine the motion vector difference; and performing coding processing on the affine picture block according to the size of the affine motion compensation picture subblock.

Therefore, the coding device according to this embodiment of the present invention determines the size of the affine motion compensation picture subblock according to the determined motion vector difference of the affine picture block, the determined motion vector precision, and the distance between the control points, and performs coding processing on the affine picture block according to the size of the affine motion compensation picture subblock. In this way, a picture subblock of an appropriate size is selected in a coding process, so that coding complexity can be reduced, and coding efficiency can be improved.

It should be understood that, in this embodiment of the present invention, the processor 31 may be a central processing unit ("CPU" for short), or the processor 31 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor, or the like.

The memory 32 may include a read-only memory and a random access memory, and provide an instruction and data to the processor 31. A part of the memory 32 may further include a non-volatile random access memory. For example, the memory 32 may further store information about a device type.

The bus system 33 may further include a power bus, a control bus, a status signal bus, and the like, in addition to a data bus. However, for clear description, various buses in the figure are marked as the bus system 33.

In an implementation process, each step of the foregoing method may be completed by using an integrated logic circuit of hardware in the processor 31 or an instruction in a form of software. The steps of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 32. The processor 31 reads information in the memory 32 and completes the steps in the foregoing method in combination with the hardware of the processor 31. To avoid repetition, details are not described again herein.

Optionally, in an embodiment, the processor 31 is specifically configured to: determine a first component of the motion vector difference according to a difference between motion vectors of a first control point and a second control point that are located on a same horizontal line; and determine a second component of the motion vector difference according to a difference between motion vectors of a third control point and a fourth control point that are located on a same vertical line; where a first horizontal distance exists between the first control point and the second control point, and a first vertical distance exists between the third control point and the fourth control point.

Optionally, in an embodiment, the processor 31 is specifically configured to: determine a first horizontal component difference and a first vertical component difference between the motion vectors of the first control point and the second control point; determine a larger one of the first horizontal component difference and the first vertical component difference as the first component of the motion vector difference; determine a second horizontal component difference and a second vertical component difference between the motion vectors of the third control point and the fourth control point; and determine a larger one of the second horizontal component difference and the second vertical component difference as the second component of the motion vector difference.

Optionally, in an embodiment, the processor 31 is specifically configured to: determine an affine transformation parameter of a pixel in the affine picture block, where pixels in the affine picture block have the same affine transformation parameter; determine the first horizontal component difference and the first vertical component difference according to the affine transformation parameter and the first horizontal distance; and determine the second horizontal component difference and the second vertical component difference according to the affine transformation parameter and the first vertical distance.

Optionally, in an embodiment, the processor 31 is specifically configured to: determine a motion vector of the first control point, a motion vector of the second control point, a motion vector of the third control point, and a motion vector of the fourth control point; determine a difference between a horizontal component of the motion vector of the first control point and a horizontal component of the motion vector of the second control point as the first horizontal component difference; determine a difference between a vertical component of the motion vector of the first control point and a vertical component of the motion vector of the second control point as the first vertical component difference; determine a difference between a horizontal component of the motion vector of the third control point and a horizontal component of the motion vector of the fourth control point as the second horizontal component difference; and determine a difference between a vertical component of the motion vector of the third control point and a vertical component of the motion vector of the fourth control point as the second vertical component difference.

Optionally, in an embodiment, the first control point and the second control point are two adjacent pixels, and the third control point and the fourth control point are two adjacent pixels.

The processor 31 is specifically configured to: determine a motion vector of a first pixel, a motion vector of a second pixel, and a motion vector of a third pixel, where the first pixel, the second pixel, and the third pixel are non-overlapping pixels; determine a second horizontal distance and a second vertical distance between the first pixel and the second pixel; determine a third horizontal distance and a third vertical distance between the first pixel and the third pixel; and determine the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

Optionally, in an embodiment, the processor 31 is specifically configured to: determine a ratio of a product of the motion vector precision and the first horizontal distance to the first component of the motion vector difference as a length of the affine motion compensation picture subblock in a horizontal direction; and determine a ratio of a product of the motion vector precision and the first vertical distance to the second component of the motion vector difference as a length of the affine motion compensation picture subblock in a vertical direction.

Optionally, in an embodiment, the processor 31 is specifically configured to: when a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than the first preset value, determine the first preset value as a length of the affine motion compensation picture subblock in a horizontal direction; and when a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than the second preset value, determine the second preset value as a length of the affine motion compensation picture subblock in a vertical direction.

Optionally, in an embodiment, the first control point and the third control point are the same pixel.

Optionally, in an embodiment, the first control point, the second control point, the third control point, and the fourth control point are vertices of the affine picture block.

Optionally, in an embodiment, the first preset value is 4, and/or the second preset value is 4.

Optionally, in an embodiment, the processor 31 is specifically configured to: determine a third preset value as the motion vector precision of the affine picture block; or determine the motion vector precision of the affine picture block according to a feature of a picture block adjacent to the affine picture block, where the adjacent picture block is a picture block spatially and/or temporally adjacent to the affine picture block.

Optionally, in an embodiment, the processor 31 is specifically configured to: determine a motion vector of each affine motion compensation picture subblock in the affine motion compensation picture subblocks; determine a motion compensation prediction signal of each affine motion compensation picture subblock according to the motion vector of each affine motion compensation picture subblock; determine a prediction residual signal of each affine motion compensation picture subblock according to the motion compensation prediction signal of each affine motion compensation picture subblock; and code the prediction residual signal of each affine motion compensation picture subblock.

Optionally, in an embodiment, the processor 31 is further configured to filter signals of boundary pixels of each affine motion compensation picture subblock, where the boundary pixels are pixels in one or more rows at a boundary of each affine motion compensation picture subblock.

Optionally, in an embodiment, the signal of the boundary pixel includes a motion compensation prediction signal and/or a reconstructed signal, and the reconstructed signal is a sum of the motion compensation prediction signal and a reconstructed residual signal.

It should be understood that, the coding device 30 according to this embodiment of the present invention may correspond to the coding device 10 in the embodiments of the present invention, and may correspond to a corresponding entity that performs the method 1000 according to the embodiments of the present invention, and the foregoing and other operations and/or functions of the modules in the coding device 30 are separately intended to implement the corresponding procedures of the method in FIG. 1 to FIG. 11. For brevity, details are not described again herein.

Therefore, the coding device according to this embodiment of the present invention determines the size of the affine motion compensation picture subblock according to the determined motion vector difference of the affine picture block, the determined motion vector precision, and the distance between the control points, and performs coding processing on the affine picture block according to the size of the affine motion compensation picture subblock. In this way, a picture subblock of an appropriate size is selected in the coding process, so that coding complexity can be reduced, and coding efficiency can be improved.

Figure 24:
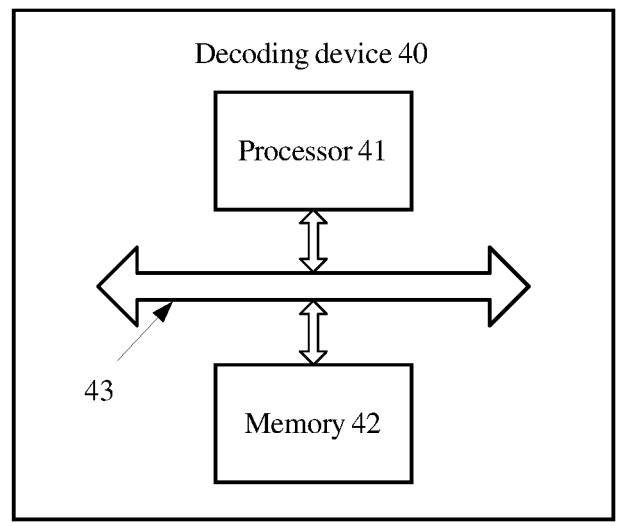
FIG. 24 is a schematic block diagram of a decoding device according to another embodiment of the present invention.

As shown in FIG. 24, an embodiment of the present invention further provides a decoding device 40, including a processor 41, a memory 42, and a bus system 43. The processor 41 and the memory 42 are connected by the bus system 43. The memory 42 is configured to store an instruction. The processor 41 is configured to execute the instruction stored in the memory 42. The memory 42 of the decoding device 40 stores program code, and the processor 41 may invoke the program code stored in the memory 42 to perform the following operations: determining a motion vector difference of an affine picture block; determining motion vector precision of the affine picture block; determining a size of an affine motion compensation picture subblock in the affine picture block according to the motion vector difference, the motion vector precision, and a distance between control points in the affine picture block, where the control points are pixels used to determine the motion vector difference; and performing decoding processing on the affine picture block according to the size of the affine motion compensation picture subblock.

Therefore, the decoding device according to this embodiment of the present invention determines the size of the affine motion compensation picture subblock according to the determined motion vector difference of the affine picture block, the determined motion vector precision, and the distance between the control points, and performs decoding processing on the affine picture block according to the size. In this way, a picture subblock of an appropriate size is selected in a decoding process, so that decoding complexity can be reduced, and decoding efficiency can be improved.

It should be understood that, in this embodiment of the present invention, the processor 41 may be a central processing unit ("CPU" for short), or the processor 41 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor, or the like.

The memory 42 may include a read-only memory and a random access memory, and provide an instruction and data to the processor 41. A part of the memory 42 may further include a non-volatile random access memory. For example, the memory 42 may further store information about a device type.

The bus system 43 may further include a power bus, a control bus, a status signal bus, and the like, in addition to a data bus. However, for clear description, various buses in the figure are marked as the bus system 43.

In an implementation process, each step of the foregoing method may be completed by using an integrated logic circuit of hardware in the processor 41 or an instruction in a form of software. The steps of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 42. The processor 41 reads information in the memory 42 and completes the steps in the foregoing method in combination with the hardware of the processor 41. To avoid repetition, details are not described again herein.

Optionally, in an embodiment, the processor 41 is specifically configured to: determine a first component of the motion vector difference according to a difference between motion vectors of a first control point and a second control point that are located on a same horizontal line; and determine a second component of the motion vector difference according to a difference between motion vectors of a third control point and a fourth control point that are located on a same vertical line; where a first horizontal distance exists between the first control point and the second control point, and a first vertical distance exists between the third control point and the fourth control point.

Optionally, in an embodiment, the processor 41 is specifically configured to: determine a first horizontal component difference and a first vertical component difference between the motion vectors of the first control point and the second control point; determine a larger one of the first horizontal component difference and the first vertical component difference as the first component of the motion vector difference; determine a second horizontal component difference and a second vertical component difference between the motion vectors of the third control point and the fourth control point; and determine a larger one of the second horizontal component difference and the second vertical component difference as the second component of the motion vector difference.

Optionally, in an embodiment, the processor 41 is specifically configured to: determine an affine transformation parameter of a pixel in the affine picture block, where pixels in the affine picture block have the same affine transformation parameter; determine the first horizontal component difference and the first vertical component difference according to the affine transformation parameter and the first horizontal distance; and determine the second horizontal component difference and the second vertical component difference according to the affine transformation parameter and the first vertical distance.

Optionally, in an embodiment, the processor 41 is specifically configured to: determine a motion vector of the first control point, a motion vector of the second control point, a motion vector of the third control point, and a motion vector of the fourth control point; determine a difference between a horizontal component of the motion vector of the first control point and a horizontal component of the motion vector of the second control point as the first horizontal component difference; determine a difference between a vertical component of the motion vector of the first control point and a vertical component of the motion vector of the second control point as the first vertical component difference; determine a difference between a horizontal component of the motion vector of the third control point and a horizontal component of the motion vector of the fourth control point as the second horizontal component difference; and determine a difference between a vertical component of the motion vector of the third control point and a vertical component of the motion vector of the fourth control point as the second vertical component difference.

Optionally, in an embodiment, the first control point and the second control point are two adjacent pixels, and the third control point and the fourth control point are two adjacent pixels.

The processor 41 is specifically configured to: determine a motion vector of a first pixel, a motion vector of a second pixel, and a motion vector of a third pixel, where the first pixel, the second pixel, and the third pixel are non-overlapping pixels; determine a second horizontal distance and a second vertical distance between the first pixel and the second pixel; determine a third horizontal distance and a third vertical distance between the first pixel and the third pixel; and determine the first horizontal component difference, the first vertical component difference, the second horizontal component difference, and the second vertical component difference according to the motion vector of the first pixel, the motion vector of the second pixel, the motion vector of the third pixel, the second horizontal distance, the second vertical distance, the third horizontal distance, and the third vertical distance.

Optionally, in an embodiment, the processor 41 is specifically configured to: determine a ratio of a product of the motion vector precision and the first horizontal distance to the first component of the motion vector difference as a length of the affine motion compensation picture subblock in a horizontal direction; and determine a ratio of a product of the motion vector precision and the first vertical distance to the second component of the motion vector difference as a length of the affine motion compensation picture subblock in a vertical direction.

Optionally, in an embodiment, the processor 41 is specifically configured to: when a ratio of a product of the motion vector precision and the first horizontal distance to the first component of the motion vector difference is greater than or equal to a first preset value, determine the ratio as a length of the affine motion compensation picture subblock in a horizontal direction; or when a ratio of a product of the motion vector precision and the first horizontal distance to the first component of the motion vector difference is less than the first preset value, determine the first preset value as a length of the affine motion compensation picture subblock in a horizontal direction; and when a ratio of a product of the motion vector precision and the first vertical distance to the second component of the motion vector difference is greater than or equal to a second preset value, determine the ratio as a length of the affine motion compensation picture subblock in a vertical direction; or when a ratio of a product of the motion vector precision and the first vertical distance to the second component of the motion vector difference is less than the second preset value, determine the second preset value as a length of the affine motion compensation picture subblock in a vertical direction.

Optionally, in an embodiment, the first control point and the third control point are the same pixel.

Optionally, in an embodiment, the first control point, the second control point, the third control point, and the fourth control point are vertices of the affine picture block.

Optionally, in an embodiment, the first preset value is 4, and/or the second preset value is 4.

Optionally, in an embodiment, the processor 41 is specifically configured to: determine a third preset value as the motion vector precision of the affine picture block; or determine the motion vector precision of the affine picture block according to a feature of a picture block adjacent to the affine picture block, where the adjacent picture block is a picture block spatially and/or temporally adjacent to the affine picture block.

Optionally, in an embodiment, the processor 41 is specifically configured to: determine a motion vector of each affine motion compensation picture subblock in the affine motion compensation picture subblocks; determine a motion compensation prediction signal of each affine motion compensation picture subblock according to the motion vector of each affine motion compensation picture subblock; determine a prediction residual signal of each affine motion compensation picture subblock according to the motion compensation prediction signal of each affine motion compensation picture subblock; and decode the prediction residual signal of each affine motion compensation picture subblock.

Optionally, in an embodiment, the processor 41 is further configured to filter signals of boundary pixels of each affine motion compensation picture subblock, where the boundary pixels are pixels in one or more rows at a boundary of each affine motion compensation picture subblock.

Optionally, in an embodiment, the signal of the boundary pixel includes a motion compensation prediction signal and/or a reconstructed signal, and the reconstructed signal is a sum of the motion compensation prediction signal and a reconstructed residual signal.

It should be understood that, the decoding device 40 according to this embodiment of the present invention may correspond to the decoding device 20 in the embodiments of the present invention, and may correspond to a corresponding entity that performs the method 2000 according to the embodiments of the present invention, and the foregoing and other operations and/or functions of the modules in the decoding device 40 are separately intended to implement the corresponding procedures of the method in FIG. 12 to FIG. 18. For brevity, details are not described again herein.

Therefore, the decoding device according to this embodiment of the present invention determines the size of the affine motion compensation picture subblock according to the determined motion vector difference of the affine picture block, the motion vector precision, and the distance between the control points, and performs decoding processing on the affine picture block according to the size. In this way, a picture subblock of an appropriate size is selected in the decoding process, so that decoding complexity can be reduced, and decoding efficiency can be improved.

It should be understood that, "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner.

It should be understood that, sequence numbers of the foregoing processes do not mean execution sequences in various embodiments of the present invention. The execution sequences of the processes should be determined according to functions and internal logic of the processes, and should not be construed as any limitation to the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification generally indicates an "or" relationship between the associated objects.

It should be understood that, in the embodiments of this application, "B corresponding to A" indicates that B is associated with A, and B may be determined according to A. However, it should also be understood that, determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A video picture encoding method performed by an encoder, the method comprising:
    obtaining motion vectors of control points of an affine picture block;
    determining a motion vector difference based on the motion vectors of the control points;
    performing encoding processing on the affine picture block over a size that varies based on the motion vector difference, a precision, and a distance between the control points of the affine picture block, wherein the size corresponds to a horizontal length and a vertical length of the affine picture block; and
    encoding a bitstream including information of the motion vectors of the control points of the affine picture block.

2. The method according to claim 1, wherein the control points include a first control point, a second control point, a third control point, and a fourth control point, the first control point and the second control point are located on a same horizontal line, and the third control point and the fourth control point are located on a same vertical line.

3. The method according to claim 2, wherein the distance between the control points of the affine picture block includes a horizontal distance and a vertical distance, the horizontal distance between the first control point and the second control point is a width W of the affine picture block, and the vertical distance between the third control point and the fourth control point is a height H of the affine picture block.

4. The method according to claim 3, wherein the motion vector difference includes a horizontal component and a vertical component, and the horizontal length and the vertical length vary based on the horizontal component, the vertical component, the precision, the horizontal distance, and the vertical distance.

5. The method according to claim 4, wherein the determining the motion vector difference comprises:
    determining the horizontal component of the motion vector difference according to a difference between motion vectors of the first control point and the second control point; and
    determining the vertical component of the motion vector difference according to a difference between motion vectors of the third control point and the fourth control point.

6. The method according to claim 5, wherein the determining the horizontal component of the motion vector difference comprises:
    determining a first horizontal component difference and a first vertical component difference between the motion vectors of the first control point and the second control point; and
    determining a larger one of the first horizontal component difference and the first vertical component difference as the horizontal component of the motion vector difference; and
    wherein the determining the vertical component of the motion vector difference comprises:
    determining a second horizontal component difference and a second vertical component difference between the motion vectors of the third control point and the fourth control point; and
    determining a larger one of the second horizontal component difference and the second vertical component difference as the vertical component of the motion vector difference.

7. The method according to claim 2, wherein the first control point and the third control point are a same control point.

8. The method according to claim 1, wherein the precision is a preset value.

9. A video picture encoding device, comprising:
    one or more processors;
    a non-transitory memory storing instructions to be executed by the one or more processors, wherein the one or more processors execute the instructions to:
    obtain motion vectors of control points of an affine picture block;
    determine a motion vector difference based on the motion vectors of the control points;
    perform encoding processing on the affine picture block over a size that varies based on the motion vector difference, a precision, and a distance between the control points of the affine picture block, wherein the size corresponds to a horizontal length and a vertical length of the affine picture block; and
    encode a bitstream including information of the motion vectors of the control points of the affine picture block.

10. The device according to claim 9, wherein the control points include a first control point, a second control point, a third control point, and a fourth control point, the first control point and the second control point are located on a same horizontal line, and the third control point and the fourth control point are located on a same vertical line.

11. The device according to claim 10, wherein the distance between the control points of the affine picture block includes a horizontal distance and a vertical distance, the horizontal distance between the first control point and the second control point is a width W of the affine picture block, and the vertical distance between the third control point and the fourth control point is a height H of the affine picture block.

12. The device according to claim 11, wherein the motion vector difference includes a horizontal component and a vertical component, and the horizontal length and the vertical length vary based on the horizontal component, the vertical component, the precision, the horizontal distance, and the vertical distance.

13. The device according to claim 12, wherein the one or more processors execute the instructions further to:
   determine the horizontal component of the motion vector difference according to a difference between motion vectors of the first control point and the second control point; and
   determine the vertical component of the motion vector difference according to a difference between motion vectors of the third control point and the fourth control point.

14. The device according to claim 13, wherein the one or more processors execute the instructions further to:
   determine a first horizontal component difference and a first vertical component difference between the motion vectors of the first control point and the second control point, wherein a larger one of the first horizontal component difference and the first vertical component difference is determined as the horizontal component of the motion vector difference; and
   determine a second horizontal component difference and a second vertical component difference between the motion vectors of the third control point and the fourth control point, wherein a larger one of the second horizontal component difference and the second vertical component difference is determined as the vertical component of the motion vector difference.

15. The device according to claim 10, wherein the first control point and the third control point are a same control point.

16. The device according to claim 9, wherein the precision is a preset value.

17. A non-transitory computer-readable storage medium storing a bitstream,
   wherein the bitstream includes information of motion vectors of control points of an affine picture block, the motion vectors of the control points enable to determine a motion vector difference, and wherein encoding processing on the affine picture block is performed over a size that varies based on the motion vector difference, a precision, and a distance between the control points of the affine picture block.

18. The non-transitory computer-readable storage medium according to claim 17, wherein the control points include a first control point, a second control point, a third control point, and a fourth control point, the first control point and the second control point are located on a same horizontal line, and the third control point and the fourth control point are located on a same vertical line.

19. The non-transitory computer-readable storage medium according to claim 18, wherein the distance between the control points of the affine picture block includes a horizontal distance and a vertical distance, the horizontal distance between the first control point and the second control point is a width W of the affine picture block, and the vertical distance between the third control point and the fourth control point is a height H of the affine picture block.

20. The non-transitory computer-readable storage medium according to claim 17, wherein the precision is a preset value.

* * * * *

UNITED STATES PATENT AND TRADEMARK OFFICE
CERTIFICATE OF CORRECTION

PATENT NO. : 11,949,908 B2
APPLICATION NO. : 17/941895
DATED : April 2, 2024
INVENTOR(S) : Zhang et al.

It is certified that error appears in the above-identified patent and that said Letters Patent is hereby corrected as shown below:

In the Specification

In Column 18, Line 17, delete "S101" and insert -- S1101 --.

Signed and Sealed this
Seventh Day of May, 2024

Katherine Kelly Vidal
*Director of the United States Patent and Trademark Office*